(12) United States Patent
Shkedi

(10) Patent No.: US 12,063,421 B1
(45) Date of Patent: Aug. 13, 2024

(54) DIRECTING ONLINE ADVERTISEMENTS BASED ON SOFTWARE OBSERVATION OF PRESENTATION OF TELEVISION ADVERTISEMENTS

(71) Applicant: INTENT IQ, LLC, Long Island City, NY (US)

(72) Inventor: Roy Shkedi, Forest Hills, NY (US)

(73) Assignee: Intent IQ, LLC, Long Island City, NY (US)

( * ) Notice: Subject to any disclaimer, the term of this patent is extended or adjusted under 35 U.S.C. 154(b) by 0 days.

(21) Appl. No.: 18/384,835

(22) Filed: Oct. 27, 2023

Related U.S. Application Data

(60) Continuation of application No. 17/401,078, filed on Aug. 12, 2021, now Pat. No. 11,831,964, which is a
(Continued)

(51) Int. Cl.
*H04N 21/61* (2011.01)
*G06Q 30/02* (2023.01)
(Continued)

(52) U.S. Cl.
CPC ......... *H04N 21/6175* (2013.01); *G06Q 30/02* (2013.01); *G06Q 30/0239* (2013.01);
(Continued)

(58) Field of Classification Search
CPC .................................................. H04N 21/6175
See application file for complete search history.

(56) References Cited

U.S. PATENT DOCUMENTS

| 5,105,184 A | 4/1992 | Pirani et al. |
| 5,428,778 A | 6/1995 | Brookes |

(Continued)

FOREIGN PATENT DOCUMENTS

| JP | 2003-331183 | 11/2003 |
| JP | 2006-004441 | 1/2006 |

(Continued)

OTHER PUBLICATIONS

U.S. Appl. No. 17/401,052, filed Aug. 12, 2021, Jun. 19, 2006, (prov.).
(Continued)

*Primary Examiner* — Michael H Hong
(74) *Attorney, Agent, or Firm* — Louis J. Hoffman; David S. Alavi

(57) ABSTRACT

In a computer-implemented method, a selected online advertisement is automatically directed to, or online activity is automatically tracked and recorded from, an online user interface device which corresponds, at the time the advertisement is directed or the activity is tracked, to a first online access identifier. The advertisement is directed or the activity is tracked based on information from a user profile that references or includes a first set-top box identifier. That information is derived at least in part from automatically collected data related to user behavior with respect to at least one television advertisement delivered to a set-top box, which set-top box corresponds, at the time of that user behavior, to the first set-top box identifier. The first online access identifier is associated with the first set-top box identifier, by being referenced or included in the user profile, by being associated in a database, or otherwise.

30 Claims, 15 Drawing Sheets

Related U.S. Application Data continuation of application No. 16/435,051, filed on Jun. 7, 2019, now Pat. No. 11,095,952, which is a division of application No. 14/089,645, filed on Nov. 25, 2013, now Pat. No. 10,321,198, which is a continuation of application No. 12/981,925, filed on Dec. 30, 2010, now Pat. No. 8,595,069, which is a continuation of application No. 11/968,117, filed on Dec. 31, 2007, now Pat. No. 8,566,164.

(51) Int. Cl.
  *G06Q 30/0207* (2023.01)
  *H04N 7/16* (2011.01)
  *H04N 21/4722* (2011.01)
  *H04N 21/81* (2011.01)

(52) U.S. Cl.
  CPC ......... *H04N 7/163* (2013.01); *H04N 21/4722* (2013.01); *H04N 21/6125* (2013.01); *H04N 21/812* (2013.01)

(56) References Cited

U.S. PATENT DOCUMENTS

| | | | |
|---|---|---|---|
| 5,636,346 | A | 6/1997 | Saxe |
| 5,740,252 | A | 4/1998 | Minor et al. |
| 5,809,242 | A | 9/1998 | Shaw et al. |
| 5,835,896 | A | 11/1998 | Fisher et al. |
| 5,848,396 | A | 12/1998 | Gerace |
| 5,855,008 | A | 12/1998 | Goldhaber et al. |
| 5,933,811 | A | 8/1999 | Angles et al. |
| 5,948,061 | A | 9/1999 | Merriman et al. |
| 5,978,013 | A | 11/1999 | Jones et al. |
| 6,026,368 | A | 2/2000 | Brown et al. |
| 6,034,689 | A | 3/2000 | White et al. |
| 6,036,601 | A | 3/2000 | Heckel |
| 6,055,573 | A | 4/2000 | Gardenswartz et al. |
| 6,073,241 | A | 6/2000 | Rosenberg et al. |
| 6,157,946 | A | 12/2000 | Itakura et al. |
| 6,160,989 | A | 12/2000 | Hendricks et al. |
| 6,189,008 | B1 | 2/2001 | Easty et al. |
| 6,216,129 | B1 | 4/2001 | Eldering |
| 6,327,574 | B1 | 12/2001 | Kramer et al. |
| 6,366,298 | B1 | 4/2002 | Haitsuka et al. |
| 6,377,986 | B1 | 4/2002 | Philyaw |
| 6,385,592 | B1 | 5/2002 | Angles et al. |
| 6,415,322 | B1 | 7/2002 | Jaye |
| 6,427,170 | B1 | 7/2002 | Sitarman et al. |
| 6,446,261 | B1 | 9/2002 | Rosser |
| 6,463,533 | B1 | 10/2002 | Calamera et al. |
| 6,463,585 | B1 | 10/2002 | Hendricks et al. |
| 6,487,538 | B1 | 11/2002 | Gupta et al. |
| 6,490,587 | B2 | 12/2002 | Easty et al. |
| 6,536,041 | B1 | 3/2003 | Knudson et al. |
| 6,543,052 | B1 | 4/2003 | Ogasawara |
| 6,684,194 | B1 | 1/2004 | Eldering et al. |
| 6,718,551 | B1 | 4/2004 | Swix et al. |
| 6,771,290 | B1 | 8/2004 | Hoyle |
| 6,832,207 | B1 | 12/2004 | Shkedi |
| 6,845,396 | B1 | 1/2005 | Kanojia |
| 6,847,992 | B1 | 1/2005 | Haitsuka et al. |
| 6,868,392 | B1 | 3/2005 | Ogasawara |
| 6,915,271 | B1 | 7/2005 | Meyer et al. |
| 6,925,440 | B1 | 8/2005 | Shkedi |
| 6,944,585 | B1 | 9/2005 | Pawson |
| 6,973,436 | B1 | 12/2005 | Shkedi |
| 7,003,789 | B1 | 2/2006 | Linehan |
| 7,013,290 | B2 | 3/2006 | Ananian |
| 7,039,699 | B1 | 5/2006 | Narin et al. |
| 7,051,351 | B2 | 5/2006 | Goldman et al. |
| 7,072,853 | B2 | 7/2006 | Shkedi |
| 7,092,926 | B2 | 8/2006 | Cerrato |
| 7,100,183 | B2 | 8/2006 | Kunkel et al. |
| 7,139,723 | B2 | 11/2006 | Conkwright et al. |
| 7,146,329 | B2 | 12/2006 | Conkwright et al. |
| 7,152,237 | B2 | 12/2006 | Flickinger et al. |
| 7,158,943 | B2 | 1/2007 | Van der Riet |
| 7,181,438 | B1 | 2/2007 | Szabo |
| 7,188,085 | B2 | 3/2007 | Pelletier |
| 7,251,628 | B1 | 7/2007 | Edlund et al. |
| 7,260,823 | B2 | 8/2007 | Schlack et al. |
| 7,299,195 | B1 | 11/2007 | Tawakol et al. |
| 7,302,419 | B2 | 11/2007 | Conkwright et al. |
| 7,305,459 | B2 | 12/2007 | Klemba et al. |
| 7,356,045 | B2 | 4/2008 | Satapati et al. |
| 7,376,714 | B1 | 5/2008 | Gerken |
| 7,428,493 | B2 | 9/2008 | Shkedi |
| 7,454,364 | B2 | 11/2008 | Shkedi |
| 7,543,319 | B2 | 6/2009 | Ludvig et al. |
| 7,634,789 | B2 | 12/2009 | Gerba et al. |
| 7,653,923 | B2 | 1/2010 | Flickinger |
| 7,664,946 | B2 | 2/2010 | Thomas et al. |
| 7,730,030 | B1 | 6/2010 | Xu |
| 7,747,745 | B2 | 6/2010 | Shkedi |
| 7,805,332 | B2 | 9/2010 | Wilson |
| 7,822,637 | B2 | 10/2010 | Shkedi |
| 7,822,639 | B2 | 10/2010 | Shkedi |
| 7,843,923 | B2 | 11/2010 | Baum |
| 7,853,255 | B2 | 12/2010 | Karaoguz et al. |
| 7,856,372 | B2 | 12/2010 | Ullah |
| 7,856,373 | B2 | 12/2010 | Ullah |
| 7,861,260 | B2 | 12/2010 | Shkedi |
| 7,890,609 | B2 | 2/2011 | Shkedi |
| 7,894,448 | B1 | 2/2011 | Lillibridge et al. |
| 7,899,862 | B2 | 3/2011 | Appelman et al. |
| 7,900,229 | B2 | 3/2011 | Dureau |
| 7,908,645 | B2 | 3/2011 | Varghese |
| 7,937,383 | B2 | 5/2011 | Hintze et al. |
| 7,958,224 | B2 | 6/2011 | Amjadi |
| 7,966,647 | B1 | 6/2011 | Igoe et al. |
| 7,971,260 | B2 | 6/2011 | Spalink et al. |
| 7,979,307 | B2 | 7/2011 | Shkedi |
| 8,015,286 | B2 | 9/2011 | Jenkins |
| 8,019,881 | B2 | 9/2011 | Sandhi et al. |
| 8,040,819 | B2 | 10/2011 | Harrington et al. |
| 8,051,444 | B2 | 11/2011 | Shkedi |
| 8,131,271 | B2 | 3/2012 | Ramer et al. |
| 8,180,674 | B2 | 5/2012 | Madhavan |
| 8,200,822 | B1 | 6/2012 | Shkedi |
| 8,204,783 | B2 | 6/2012 | Shkedi |
| 8,204,965 | B2 | 6/2012 | Shkedi |
| 8,239,264 | B2 | 8/2012 | Shkedi |
| 8,244,574 | B2 | 8/2012 | Shkedi |
| 8,244,582 | B2 | 8/2012 | Shkedi |
| 8,244,583 | B2 | 8/2012 | Shkedi |
| 8,244,586 | B2 | 8/2012 | Shkedi |
| 8,280,758 | B2 | 10/2012 | Shkedi |
| 8,281,336 | B2 | 10/2012 | Shkedi |
| 8,296,437 | B2 | 10/2012 | Pankratov |
| 8,341,247 | B2 | 12/2012 | Shkedi |
| 8,402,356 | B2 | 3/2013 | Martinez et al. |
| 8,438,170 | B2 | 5/2013 | Koran et al. |
| 8,468,578 | B1 | 6/2013 | Lu et al. |
| 8,494,904 | B2 | 7/2013 | Shkedi |
| 8,505,046 | B2 | 8/2013 | Small et al. |
| 8,566,164 | B2 | 10/2013 | Shkedi et al. |
| 8,589,210 | B2 | 11/2013 | Shkedi |
| 8,595,069 | B2 | 11/2013 | Shkedi et al. |
| 8,600,815 | B2 | 12/2013 | Shkedi |
| 8,607,267 | B2 | 12/2013 | Shkedi |
| 8,671,139 | B2 | 3/2014 | Shkedi |
| 8,677,398 | B2 | 3/2014 | Shkedi |
| 8,683,502 | B2 | 3/2014 | Shkedi et al. |
| 8,695,032 | B2 | 4/2014 | Shkedi |
| 8,700,464 | B1 | 4/2014 | McAllister et al. |
| 8,713,600 | B2 | 4/2014 | Shkedi |
| 8,725,571 | B1 | 5/2014 | McAllister et al. |
| 8,775,249 | B2 | 7/2014 | Shkedi |
| 8,930,239 | B2 | 1/2015 | Ashbaugh |
| 8,959,146 | B2 | 2/2015 | Shkedi |
| 8,997,138 | B2 | 3/2015 | Shkedi |
| 9,036,981 | B2 | 5/2015 | Barton et al. |
| 9,071,886 | B2 | 6/2015 | Shkedi |

(56) References Cited

U.S. PATENT DOCUMENTS

| | | | |
|---|---|---|---|
| 9,078,035 B2 | 7/2015 | Shkedi et al. | |
| 9,083,853 B2 | 7/2015 | Shkedi | |
| 9,110,903 B2 | 8/2015 | Martinez et al. | |
| 9,123,071 B1 | 9/2015 | McFarland | |
| 9,131,282 B2 | 9/2015 | Shkedi | |
| 9,208,514 B2 | 12/2015 | Shkedi | |
| 9,226,019 B2 | 12/2015 | Shkedi | |
| 9,271,024 B2 | 2/2016 | Shkedi et al. | |
| 9,351,053 B2 | 5/2016 | Shkedi | |
| 9,369,779 B2 | 6/2016 | Shkedi | |
| 9,495,682 B2 | 11/2016 | Vallier | |
| 9,508,089 B2 | 11/2016 | Shkedi | |
| 9,571,865 B2 | 2/2017 | Shkedi | |
| 9,591,380 B2 | 3/2017 | Shkedi et al. | |
| 9,756,372 B2 | 9/2017 | Shkedi | |
| 9,800,917 B2 | 10/2017 | Shkedi | |
| 9,813,778 B2 | 11/2017 | Shkedi | |
| 9,830,615 B2 | 11/2017 | Shkedi | |
| 10,009,636 B2 | 6/2018 | Shkedi | |
| 10,026,100 B2 | 7/2018 | Shkedi | |
| 10,070,200 B2 | 9/2018 | Shkedi et al. | |
| 10,134,054 B2 | 11/2018 | Shkedi | |
| 10,178,442 B2 | 1/2019 | Shkedi | |
| 10,306,282 B2 | 5/2019 | Shkedi | |
| 10,321,198 B2 | 6/2019 | Shkedi et al. | |
| 10,405,058 B2 | 9/2019 | Shkedi | |
| 10,475,073 B2 | 11/2019 | Shkedi | |
| 10,628,857 B2 | 4/2020 | Shkedi | |
| 10,645,438 B2 | 5/2020 | Shkedi | |
| 10,715,878 B2 | 7/2020 | Shkedi | |
| 10,771,860 B2 | 9/2020 | Shkedi et al. | |
| 10,834,438 B2 | 11/2020 | Shkedi | |
| 10,839,423 B2 | 11/2020 | Shkedi | |
| 10,984,445 B2 | 4/2021 | Shkedi | |
| 11,082,753 B2 | 8/2021 | Shkedi et al. | |
| 11,093,970 B2 | 8/2021 | Shkedi | |
| 11,095,952 B2 | 8/2021 | Shkedi et al. | |
| 11,282,105 B1 | 3/2022 | Shkedi et al. | |
| 11,301,898 B2 | 4/2022 | Shkedi | |
| 11,303,973 B2 | 4/2022 | Shkedi et al. | |
| 11,368,763 B2 | 6/2022 | Shkedi et al. | |
| 11,564,015 B2 | 1/2023 | Shkedi | |
| 11,589,136 B2 | 2/2023 | Shkedi | |
| 11,949,962 B2 | 4/2024 | Shkedi et al. | |
| 2001/0020242 A1 | 9/2001 | Gupta et al. | |
| 2001/0049620 A1* | 12/2001 | Blasko | G06Q 30/0207 705/14.1 |
| 2002/0010653 A1 | 1/2002 | Lee | |
| 2002/0013943 A1 | 1/2002 | Haberman et al. | |
| 2002/0019769 A1 | 2/2002 | Barritz et al. | |
| 2002/0032603 A1 | 3/2002 | Yeiser | |
| 2002/0046105 A1 | 4/2002 | Gardenswartz et al. | |
| 2002/0049968 A1 | 4/2002 | Wilson et al. | |
| 2002/0056088 A1 | 5/2002 | Silva et al. | |
| 2002/0059094 A1 | 5/2002 | Hosea et al. | |
| 2002/0059602 A1 | 5/2002 | Macrae et al. | |
| 2002/0078444 A1 | 6/2002 | Krewin et al. | |
| 2002/0082910 A1 | 6/2002 | Kontogouris | |
| 2002/0083043 A1 | 6/2002 | Hoshi et al. | |
| 2002/0099842 A1 | 7/2002 | Jennings et al. | |
| 2002/0104086 A1 | 8/2002 | Tomsen et al. | |
| 2002/0116313 A1 | 8/2002 | Detering | |
| 2002/0120933 A1 | 8/2002 | Knudson et al. | |
| 2002/0120935 A1 | 8/2002 | Huber et al. | |
| 2002/0123928 A1 | 9/2002 | Eldering et al. | |
| 2002/0124050 A1 | 9/2002 | Middeljans | |
| 2002/0124249 A1 | 9/2002 | Shintani et al. | |
| 2002/0124253 A1 | 9/2002 | Eyer et al. | |
| 2002/0129362 A1 | 9/2002 | Chang et al. | |
| 2002/0129368 A1 | 9/2002 | Schlack et al. | |
| 2002/0145621 A1 | 10/2002 | Nguyen | |
| 2002/0147645 A1 | 10/2002 | Alao et al. | |
| 2002/0166119 A1 | 11/2002 | Cristofalo | |
| 2002/0174444 A1 | 11/2002 | Gatto et al. | |
| 2002/0194058 A1 | 12/2002 | Eldering | |
| 2002/0194604 A1 | 12/2002 | Sanchez et al. | |
| 2003/0041156 A1 | 2/2003 | Pickover et al. | |
| 2003/0046689 A1 | 3/2003 | Gaos | |
| 2003/0050863 A1 | 3/2003 | Radwin | |
| 2003/0051242 A1 | 3/2003 | Donnelly | |
| 2003/0066078 A1 | 4/2003 | Bjorgan et al. | |
| 2003/0066085 A1 | 4/2003 | Boyer et al. | |
| 2003/0080997 A1 | 5/2003 | Fuehran et al. | |
| 2003/0083938 A1 | 5/2003 | Smith et al. | |
| 2003/0093311 A1 | 5/2003 | Knowlson | |
| 2003/0093792 A1 | 5/2003 | Labeeb | |
| 2003/0126597 A1 | 7/2003 | Darby et al. | |
| 2003/0131355 A1 | 7/2003 | Berenson et al. | |
| 2003/0145323 A1 | 7/2003 | Hendricks et al. | |
| 2003/0149975 A1 | 8/2003 | Eldering et al. | |
| 2003/0187726 A1 | 10/2003 | Bull et al. | |
| 2003/0187949 A1 | 10/2003 | Bhatt et al. | |
| 2003/0207685 A1 | 11/2003 | Rankin | |
| 2003/0208756 A1 | 11/2003 | Macrae et al. | |
| 2003/0208758 A1 | 11/2003 | Schein et al. | |
| 2003/0226141 A1 | 12/2003 | Krasnow et al. | |
| 2003/0229893 A1 | 12/2003 | Sgaraglino | |
| 2003/0229900 A1 | 12/2003 | Reisman | |
| 2004/0003292 A1 | 1/2004 | Kato | |
| 2004/0003406 A1 | 1/2004 | Billmaier | |
| 2004/0010546 A1 | 1/2004 | Klug et al. | |
| 2004/0044566 A1 | 3/2004 | Bostelmann et al. | |
| 2004/0078809 A1 | 4/2004 | Drazin | |
| 2004/0107287 A1 | 6/2004 | Ananda et al. | |
| 2004/0107437 A1 | 6/2004 | Reichardt et al. | |
| 2004/0111640 A1 | 6/2004 | Baum | |
| 2004/0117827 A1 | 6/2004 | Karaoguz et al. | |
| 2004/0123314 A1 | 6/2004 | Bova | |
| 2004/0128547 A1 | 7/2004 | Laidlaw et al. | |
| 2004/0133689 A1 | 7/2004 | Vasisht | |
| 2004/0147265 A1 | 7/2004 | Kelley et al. | |
| 2004/0163101 A1 | 8/2004 | Swix et al. | |
| 2004/0172650 A1 | 9/2004 | Hawkins et al. | |
| 2004/0177147 A1 | 9/2004 | Joshi et al. | |
| 2004/0215515 A1 | 10/2004 | Perry | |
| 2004/0249726 A1 | 12/2004 | Linehan | |
| 2005/0021387 A1 | 1/2005 | Gottfurcht | |
| 2005/0076393 A1 | 4/2005 | Sussman | |
| 2005/0086109 A1 | 4/2005 | McFadden et al. | |
| 2005/0086112 A1 | 4/2005 | Shkedi | |
| 2005/0096978 A1 | 5/2005 | Black | |
| 2005/0096980 A1 | 5/2005 | Koningstein | |
| 2005/0108091 A1 | 5/2005 | Sotak et al. | |
| 2005/0108418 A1 | 5/2005 | Bedi et al. | |
| 2005/0125289 A1 | 6/2005 | Beyda et al. | |
| 2005/0125290 A1 | 6/2005 | Beyda et al. | |
| 2005/0160002 A1 | 7/2005 | Roetter et al. | |
| 2005/0165638 A1 | 7/2005 | Piller | |
| 2005/0165643 A1 | 7/2005 | Wilson et al. | |
| 2005/0165644 A1 | 7/2005 | Beyda et al. | |
| 2005/0175181 A1 | 8/2005 | Bergs et al. | |
| 2005/0177420 A1 | 8/2005 | Tanahashi | |
| 2005/0187823 A1 | 8/2005 | Howes | |
| 2005/0229215 A1 | 10/2005 | Schein et al. | |
| 2005/0246736 A1 | 11/2005 | Beyda et al. | |
| 2005/0278731 A1 | 12/2005 | Cameron et al. | |
| 2006/0039386 A1 | 2/2006 | Park | |
| 2006/0069616 A1 | 3/2006 | Bau | |
| 2006/0116924 A1 | 6/2006 | Angles et al. | |
| 2006/0128364 A1 | 6/2006 | Costa-Requena et al. | |
| 2006/0137015 A1 | 6/2006 | Fahrny et al. | |
| 2006/0212350 A1 | 9/2006 | Ellis et al. | |
| 2006/0229930 A9 | 10/2006 | Gottfurcht | |
| 2006/0230427 A1 | 10/2006 | Kunkel et al. | |
| 2006/0242294 A1 | 10/2006 | Damick et al. | |
| 2006/0253323 A1 | 11/2006 | Phan et al. | |
| 2006/0259357 A1 | 11/2006 | Chiu | |
| 2006/0265507 A1 | 11/2006 | Banga et al. | |
| 2006/0271690 A1 | 11/2006 | Banga et al. | |
| 2006/0271953 A1 | 11/2006 | Jacoby et al. | |
| 2006/0274741 A1 | 12/2006 | Wing et al. | |
| 2006/0282328 A1 | 12/2006 | Gerace et al. | |
| 2006/0287916 A1 | 12/2006 | Starr et al. | |
| 2007/0025306 A1 | 2/2007 | Cox et al. | |

(56) References Cited

U.S. PATENT DOCUMENTS

| | | |
|---|---|---|
| 2007/0027850 A1 | 2/2007 | Chan et al. |
| 2007/0027901 A1 | 2/2007 | Chan et al. |
| 2007/0033269 A1 | 2/2007 | Atkinson |
| 2007/0038516 A1 | 2/2007 | Apple et al. |
| 2007/0039020 A1 | 2/2007 | Cansler et al. |
| 2007/0047568 A1 | 3/2007 | Wang et al. |
| 2007/0061331 A1 | 3/2007 | Ramer et al. |
| 2007/0061838 A1 | 3/2007 | Grubbs et al. |
| 2007/0067459 A1 | 3/2007 | Baal-Haness |
| 2007/0073585 A1 | 3/2007 | Apple et al. |
| 2007/0078849 A1 | 4/2007 | Slothouber |
| 2007/0088603 A1 | 4/2007 | Jouppi et al. |
| 2007/0089127 A1 | 4/2007 | Flickinger et al. |
| 2007/0100690 A1 | 5/2007 | Hopkins |
| 2007/0115389 A1 | 5/2007 | McCarthy et al. |
| 2007/0130015 A1 | 6/2007 | Starr et al. |
| 2007/0143786 A1 | 6/2007 | Deitsch |
| 2007/0157247 A1 | 7/2007 | Cordray et al. |
| 2007/0180147 A1 | 8/2007 | Leigh |
| 2007/0198327 A1 | 8/2007 | Yazdani et al. |
| 2007/0198532 A1 | 8/2007 | Krikorian |
| 2007/0206773 A1 | 9/2007 | Branam |
| 2007/0208619 A1 | 9/2007 | Branam et al. |
| 2007/0208789 A1 | 9/2007 | Reichman |
| 2007/0214048 A1 | 9/2007 | Chan et al. |
| 2007/0217436 A1 | 9/2007 | Markley et al. |
| 2007/0220553 A1 | 9/2007 | Branam |
| 2007/0233571 A1 | 10/2007 | Eldering et al. |
| 2007/0244750 A1 | 10/2007 | Grannan et al. |
| 2007/0260514 A1 | 11/2007 | Burdick et al. |
| 2007/0266403 A1 | 11/2007 | Ou et al. |
| 2007/0277220 A1 | 11/2007 | Shikuma et al. |
| 2007/0283384 A1 | 12/2007 | Haeuser et al. |
| 2007/0287498 A1 | 12/2007 | Wang et al. |
| 2007/0294721 A1* | 12/2007 | Haeuser ............... H04N 21/812 348/E7.071 |
| 2008/0016540 A1 | 1/2008 | Savoor et al. |
| 2008/0040742 A1 | 2/2008 | Howcroft et al. |
| 2008/0046942 A1 | 2/2008 | Merlin |
| 2008/0109306 A1 | 5/2008 | Maigret et al. |
| 2008/0109307 A1 | 5/2008 | Ullah |
| 2008/0109376 A1 | 5/2008 | Walsh et al. |
| 2008/0109843 A1 | 5/2008 | Ullah |
| 2008/0113674 A1 | 5/2008 | Baig |
| 2008/0118063 A1 | 5/2008 | Guzman et al. |
| 2008/0120178 A1 | 5/2008 | Martinez et al. |
| 2008/0126180 A1 | 5/2008 | Ullah |
| 2008/0126198 A1 | 5/2008 | Ullah |
| 2008/0126199 A1 | 5/2008 | Ullah |
| 2008/0133748 A1 | 6/2008 | Nicholas |
| 2008/0155613 A1 | 6/2008 | Benya et al. |
| 2008/0189360 A1 | 8/2008 | Kiley et al. |
| 2008/0195664 A1 | 8/2008 | Maharajh et al. |
| 2008/0201731 A1 | 8/2008 | Howcroft |
| 2008/0201772 A1 | 8/2008 | Mondaeev et al. |
| 2008/0222283 A1 | 9/2008 | Ertugrul et al. |
| 2008/0235090 A1 | 9/2008 | Lundstrom et al. |
| 2008/0243822 A1 | 10/2008 | Campbell et al. |
| 2008/0255944 A1 | 10/2008 | Shah et al. |
| 2008/0262901 A1 | 10/2008 | Banga et al. |
| 2008/0263633 A1 | 10/2008 | Banga et al. |
| 2008/0281697 A1 | 11/2008 | Whitehead |
| 2008/0307112 A1 | 12/2008 | Andreasson et al. |
| 2008/0313029 A1 | 12/2008 | Evans |
| 2009/0049469 A1* | 2/2009 | Small ..................... H04L 12/66 725/35 |
| 2009/0055862 A1 | 2/2009 | Knoller et al. |
| 2009/0106100 A1 | 4/2009 | Mashinsky |
| 2009/0119151 A1 | 5/2009 | de Heer |
| 2009/0150927 A1 | 6/2009 | Kouhi et al. |
| 2009/0171780 A1 | 7/2009 | Aldrey et al. |
| 2009/0172723 A1 | 7/2009 | Shkedi et al. |
| 2009/0204706 A1 | 8/2009 | Ertugrul et al. |
| 2009/0299857 A1 | 12/2009 | Brubaker |
| 2010/0076848 A1 | 3/2010 | Stefanik et al. |
| 2010/0287048 A1 | 11/2010 | Ramer et al. |
| 2011/0125592 A1 | 5/2011 | Mesaros |
| 2011/0167043 A1 | 7/2011 | Hintze et al. |
| 2011/0258049 A1 | 10/2011 | Ramer et al. |
| 2012/0023522 A1 | 1/2012 | Anderson |
| 2013/0104159 A1 | 4/2013 | John |
| 2013/0254035 A1 | 9/2013 | Ramer et al. |

FOREIGN PATENT DOCUMENTS

| | | |
|---|---|---|
| JP | 2006-324763 | 1/2006 |
| JP | 2007150762 | 6/2007 |
| JP | 2007-274246 | 10/2007 |
| KR | 10-0793513 | 3/2006 |
| KR | 20060065969 | 6/2006 |
| KR | 10-2009-0113456 | 8/2012 |
| WO | WO00/79798 | 12/2000 |
| WO | WO01/84440 | 11/2001 |
| WO | WO 02/19720 | 3/2002 |
| WO | WO2004086680 | 10/2004 |
| WO | WO 2005/046237 | 5/2005 |
| WO | WO2007078283 | 7/2007 |
| WO | WO2007117613 | 10/2007 |

OTHER PUBLICATIONS

U.S. Appl. No. 18/618,904, filed Mar. 27, 2024, Aug. 3, 2011, (prov.).
U.S. Appl. No. 18/384,836, filed Oct. 27, 2023, Jun. 16, 2006, (prov.).
U.S. Appl. No. 18/372,692, filed Sep. 25, 2023, Jan. 30, 2013.
U.S. Appl. No. 18/207,125, filed Jun. 7, 2023, Apr. 17, 2007.
Ex Parte Reexam 90/015,290, Aug. 31, 2023, Re: parent U.S. Pat. No. 10,321,198 (reexam ordered Nov. 27, 2023).
Ex Parte Reexam 90/015,288, Aug. 31, 2023, Re: parent U.S. Pat. No. 8,566,164 (reexam ordered Nov. 27, 2023).
IPR2022-00953, May 24, 2022, Re: parent U.S. Pat. No. 5,866,164 (institution denied).
IPR2022-00959, May 24, 2022, Re: parent U.S. Pat. No. 8,595,069 (institution denied) .
IPR2022-00960, May 24, 2022, Re: parent U.S. Pat. No. 10,321,198 (institution denied).
IPR2022-01506, Sep. 7, 2022, Re: parent U.S. Pat. No. 8,566,164 (institution denied).
IPR2022-01507, Sep. 7, 2022, Re: parent U.S. Pat. No. 10,321,198 (institution denied).
IPR2023-01281, Aug. 4, 2023, Re: U.S. Pat. No. 10,715,878 (instituted Feb. 22, 2024).
Ex Parte Reexam 90/015,284, Aug. 31, 2023, Re: U.S. Pat. No. 8,677,398 (reexam ordered Nov. 27, 2023).
IPR2024-00419, Mar. 1, 2024, re: U.S. Pat. No. 11,564,015 (pending).
IPR2024-00420, Mar. 1, 2024, Re: U.S. Pat. No. 11,564,015 (pending).
IPR2024-00421, Mar. 1, 2024, Re: U.S. Pat. No. 7,861,260 (pending)
IPR2024-00422, Mar. 1, 2024, Re: U.S. Pat. No. 7,861,260 (pending).
IPR2024-00423, Mar. 1, 2024, Re: U.S. Pat. No. 7,861,260 (pending).
IPR2024-00424, Mar. 1, 2024, Re: U.S. Pat. No. 7,861,260 (pending).
Engage Technologies, Inc .; Form S-1A; filed with the SEC; pp. 36-50; Jul. 19, 1999.
Chen, Andy; "Behavioral Matchmaking, Part 3: GPS and Behavioral Targeting"; from website http://www.clickz.com; Nov. 24, 2004.
Battelle, John; "The Search How Google and Its Rivals Rewrote the Rules of Business and Transformed Our Culture"; pp. 167-171; 2005.
"BSkyB in Google Link-up"; Financial Times (FT.com); Dec. 6, 2006.
"Google moves into TV ads with BSkyB Deal"; Guardian Unlimited; Dec. 7, 2006.

(56) References Cited

OTHER PUBLICATIONS

Chen, Andy; "The New Behavioral Wunder"; from webpage http://www.clickz.com; Apr. 11, 2007.
"180Solutions Launches All-In-One Online Ad Solution—Metricsdirect Outperforms Conventional Cost-Per-Click Models"; from www.zango.com; Mar. 30, 2004.
Keegan, Paul; "The Man Who Can Save Advertising"; from http://money.cnn.com; Nov. 1, 2004.
"Visible World Targets Advertising Industry"; from http://informitv.com; Feb. 20, 2005.
"Venture Market Summary"; VentureWire Alert; Mar. 29, 2005.
Olsen, S.; "TiVo is in talks with Internet search giants Google and Yahoo over possible deal . . . television and the Web . . . "; www.news.com; Apr. 18, 2005.
"This Ad's for You—Just You"; BusinessWeek online; Jun. 28, 2005.
"Cable's Big Bet On Hyper-Targeting. Time Warner will test new software that sends different ads to different viewers."; BusinessWire online; Jul. 4, 2005.
"Comcast, Cox Buy Interactive TV Company"; from Yahoo.com Financial News; Jul. 13, 2005.
"TiVo Launches New Interactive Advertising Technology"; press release from www.tivo.com; Jul. 18, 2005.
Grant, Peter; "To Ward Off New Competitors, Comcast Builds a Mini Internet"; Wall Street Journal online; Oct. 13, 2005.
"TiVo Announces First Advertising Search Product for Television"; press release from www.tivo.com; Nov. 28, 2005.
"TiVo Begins Rollout of Online Services Now Accessible Directly on the TV"; press release from www.tivo.com; Dec. 1, 2005.
"Comcast, Time Warner Cable hopeful on network DVRs"; from www.reuters.com; Mar. 30, 2006.
"TiVo Launches Television's New Advertising Search Product"; press release from www.tivo.com; May 8, 2006.
TiVo and Brightcove Partner to Deliver Broadband Content to TiVo Subscribers; press release from www.tivo.com; May 10, 2006.
"TiVo Debuts New Lexus Car Configuration Application"; press release from www.tivo.com; May 11, 2006.
Newcomb, Kevin; "BMW Uses TiVo Technology to Improve Product Placement"; from www.clickz.com; Jun. 21, 2006.
Wingfield, Nick; "New TiVo Feature Lets Families Share Videos On TV Via the Web"; The Wall Street Journal Online; Nov. 14, 2006.
Kaye, Kate; "TiVo Broadens CBS Offerings, Adds Web-to-TV Services"; from www.clickz.com; Nov. 15, 2006.
Grant, Peter and MARR, Merissa; "Comcast Nears Pact With Disney To Offer ABC Shows On Demand"; The Wall Street Journal Online; Nov. 21, 2006.
"TiVo to Insert Ads At End of Programs"; The Wall Street Journal Online; Nov. 28, 2006.
FAQ from Zango Ad Services; http://adservices.zango.com; 2007.
Shukla, Anuradha; "Visible World Offers 'Any Screen' Solution for Customized Video Advertising"; from www.tmcnet.com; Feb. 6, 2007.
Tam, Pui-Wing; "TiVo, Amazon to Deliver Web Video to TV Sets"; The Wall Stree Journal Online; Feb. 7, 2007.
Story, Louise; "The Web drives an advertising boom without the need for agencies"; International Herald Tribune (iht.com); Feb. 8, 2007.
Todd, Daniel; "The New World of Desktop Advertising"; DMNews.com; Mar. 28, 2007.
"Medio Systems to Launch Mobile Performance Ad Network—Search and recommendation technologies propel advancements in mobile advertising", article from Mobilestreams website, Mar. 19, 2007.
Hunt, Timothy J., "Moving Target", Financial Post, Oct. 1, 2000.
"NetZero and Juno's sophisticated targeting capabilities enable advertisers to hit an exact audience of qualified consumers"; from www.untd.com; 2007.
Luening, E.; "Free ISP NetZero beefs up ad services"; web page at http://www.news.com/Free-ISP-NetZero-beefs-up-ad-services/2100-1023_3-241067.html; Jan. 2, 2002.
Saunders, C.; "NetZero to Launch Mobile Ad Platform"; from website www.clickz.com; Mar. 29, 2001.
Bergstein, B.; "Ad-targeted System Monitors Your Interests with ISP's Help"; from website www.siliconvalley.com; Dec. 10, 2007.
White, B.; "Watching What You See on the Web"; Wall Street Journal Online; Dec. 6, 2007.
"What's New: The Latest On Technology Deals"; from Dow Jones VentureWire; as published on Wall Street Journal Online; Oct. 22, 2007.
"LookSmart and NetZero Extend and Enhance Winning Partnership"; press release found on www.shareholder.com; Feb. 9, 2000.
"NetZero Guarantees Increase in Web Site Traffic for New Adverstisers"; press release from www.irconnect.com; circa 2000.
"Nissan, BellSouth, Music Blvd. Among Latest Advertisers to Sign Up With NetZero"; press release from www.irconnect.com; Nov. 16, 1998.
"NetZero Launches Ad-Backed Access Service"; from website www.clickz.com; Oct. 20, 1998.
"DoubleClick Launches New Marketing Solutions"; from website www.clickz.com; Oct. 6, 1998.
Poikselktä, Miikka, et al.; "IMS Concepts"; The IMS: IP 1-15 Multimedia Concepts and Services, Second Edition; John Wiley & Sons, Ltd.; 2006; pp. 43-116.
Baldwin, Dirk, et al., "A Comparison of Profile Based Advertising Schemes," IEEE/SMC Int'l Conf. on System of Systems Eng'g, pp. 316-321 (Apr. 2006).
Robbin Zeff & Brad Aronson, Advertising on the Internet (2d ed. 1999) ("Zeff"); chapters 1, 2, 4, 6, 7, 9, and 10.
RFC 950, "Internet Standard Subnetting Procedure," Aug. 1985; pp. 1-18.
RFC 1531, "Dynamic Host Configuration Protocol," Oct. 1993; pp. 1-39.
Definition of "modem," H. Newton, Newton's Telecom Dictionary, CMP Books, 2000.
Fletcher et al., Practical Web Traffic Analysis: Standard, Privacy, Techniques, Results (2002); Chapters 1 and 3.
Microsoft Computer Dictionary (5th ed. 2002); pp. vii-viii, 444.
Zwicky, Building Internet Firewalls (2d ed. 2000): table of contents, ch. 5.
Hahn, The Internet Complete Reference (2d ed. 1996); chapters 10, 25, 26.
P. Srisuresh et al., Request for Comments (RFC) 2663, IP Network Translator (NAT) Terminology and Considerations, Aug. 1999 ("RFC 2663").
Request for Comments (RFC) 793, Transmission Control Protocol, DARPA Internet Program Protocol Specification, Sep. 1981 ("RFC 793").
O'Harrow, Robert, Washington Post, "Officials Fear Plague of 'Web Bugs'" (Nov. 13, 1999).
Archived website pages from http://www.jambo.net (Dec. 29, 2005).
Barrett, D., Engadget, "Jambo, Social Networking Tool at MWSF" (Dec. 31, 2005).
Archived website pages from http://www.jambo.net (Feb. 8, 2006).
Needleman, R., CNET.com, "Jambo brings your online social network into the real world" (May 24, 2006).
McGill, A., D Magazine, "A New Way to Network" (Aug. 1, 2006).
Lemos, R., CNET.com, "TiVo service tracks viewer data" (Jun. 3, 2003).
Bond, P., hollywoodreporter.com, "NBC Universal time-shifts with TiVo data" (Nov. 28, 2007).
Olsen, S., CNET.com, "TiVo looks to tune in to advertisers" (Mar. 25, 2004).
Mills, E., CNET.com, "Google TV Ads to get Nielsen data" (Oct. 23, 2007).
Perez, J., computerworld.com, "Google to use Nielsen to track ads" (Oct. 24, 2007).
Sterling, G., searchengineland.com, Google TV Ads: Google Brings Auction Model To TV Advertising (Apr. 2, 2007).
Archived website pages from http://www.doubleclick.net (Feb. 5, 1998).
Archived website pages from http://www.doubleclick.com/uk (Jul. 8, 1998).

(56) References Cited

OTHER PUBLICATIONS

Archived website pages from http://www.doubleclick.com (Jul. 8, 1998).
Archived website pages from http://www.doubleclick.net (Feb. 29, 2000).
Archived website pages from http://www.doubleclick.net (Mar. 2, 2000).
Tedeschi, B., New York Times On the Web, "DoubleClick's Competitors Relieved, for Now" (Mar. 6, 2000).
Archived website pages from http://www.doubleclick.net (Aug. 15, 2000).
Archived website pages from http://www.doubleclick.net (Aug. 17, 2000).
Archived website pages from http://www.doubleclick.com (Jan. 23, 2005).
Archived website pages from http://www.doubleclick.com (Jul. 16, 2005).
Archived website pages from http://www.doubleclick.com (Jul. 17, 2005).
Archived website pages from http://www.doubleclick.com (Jul. 18, 2005).
Archived website pages from http://www.doubleclick.com (Jul. 28, 2005).
Archived website pages from http://www.doubleclick.com (Aug. 10, 2005).
Archived website pages from http://www.doubleclick.com (Sep. 24, 2005).
Archived website pages from http://www.doubleclick.com (Nov. 27, 2005).
Archived website pages from http://www.doubleclick.com (Feb. 28, 2006).
Archived website pages from http://www.doubleclick.com (Apr. 27, 2006).
Archived website pages from http://www.doubleclick.com (Apr. 28, 2006).
Archived website pages from http://www.doubleclick.com (May 13, 2006).
Archived website pages from http://www.doubleclick.com (May 27, 2006).
Archived website pages from http://www.doubleclick.com (Aug. 28, 2006).
Archived website pages from http://www.doubleclick.com (Sep. 1, 2006).
Archived website pages re: xbox from http://research.microsoft.com (Feb. 8, 2007).
O'Connor, The Map of Innovation, Creating Something Out of Nothing (pp. 181-217) (2003).
Archived website pages re:xbox from http://support.microsoft.com (Oct. 17, 2007).
Interactive PR, vol. 2, No. 16, interview with Kevin O'Connor, "The Burger King of Internet Advertising" (Aug. 12, 1996).
Advertising Age, "Digital Media Masters; Kevin O'Connor; DoubleClick" (Sep. 23, 1996).
DoubleClick Inc., Form S-1 Registration Statement (1997).
Archived website pages from http://www.doubleclick.net (Dec. 2, 1998).
New York Times, "An Advertising Power, but Just What Does Doubleclick Do?" (Sep. 22, 1999).
Excerpts from Downing et al., Dictionary of Computer and Internet Terms (8th ed. 2003).
Hagel et al., Net Worth: Shaping Markets When Customers Make the Rules (1999).
Request for Comments: 1631, "The IP Network Address Translator (NAT)" (1994).
ANSI/IEEE Std 802.11, 1999 Edition, "Part 11: Wireless LAN Medium Access Control (MAC) and Physical Layer (PHY) Specifications".
Excerpts from Computer Dictionary, Microsoft Press (2d ed. 1994).
Excerpts from Newton, Newton's Telecom Dictionary (21st ed. 2005).
Excerpts from Webster's New World Computer Dictionary (10th ed. 2003).
Nielsen, Jakob; "Request Marketing"; from website www.nngroup.com; Oct. 14, 2000.
Bettina Fabos, The Commercial Search Engine Industry and Alternatives to the Oligopoly (Mar. 2006).
Susan Young, Getting the Message: How the Internet is Changing Advertising (May 16, 2000).

\* cited by examiner

DIRECTING ONLINE ADVERTISEMENTS BASED ON SOFTWARE OBSERVATION OF PRESENTATION OF TELEVISION ADVERTISEMENTS

CROSS-REFERENCE TO RELATED APPLICATIONS

This application is a continuation of Ser. No. 17/401,078, filed Aug. 12, 2021, now U.S. Pat. No. 11,831,964, which is a continuation of Ser. No. 16/435,051, filed Jun. 7, 2019, now U.S. Pat. No. 11,095,952, which is a division of Ser. No. 14/089,645, filed Nov. 25, 2013, now U.S. Pat. No. 10,321,198, which is a continuation of Ser. No. 12/981,925, filed Dec. 30, 2010, now U.S. Pat. No. 8,595,069, which is a continuation of Ser. No. 11/968,117, filed Dec. 31, 2007, now U.S. Pat. No. 8,566,164.

BACKGROUND

The field of the present invention relates to online access and targeted delivery or presentation of advertisements. In particular, online advertisements are targeted based on observed viewing of or interacting with a television advertisement by a television viewer.

Systems or methods disclosed herein may be related to U.S. non-provisional application Ser. No. 11/736,544 filed Apr. 17, 2007, which application is hereby incorporated by reference as if fully set forth herein.

Some of the terms used in the present disclosure or appended claims are defined as follows.

Television provider (TVP)—an entity that provides television service to a subscriber or user via any suitable transmission medium, including but not limited to coaxial cable, fiber-optical cable, network cable, phone line, satellite transmission, or VHF or UHF transmission.

Internet service provider (ISP; equivalently, an online access provider)—an entity that provides online access to a subscriber or user via any suitable transmission medium, including but not limited to coaxial cable, fiber-optical cable, network cable, phone line, satellite transmission, wireless transmission (e.g., WiMax, WiFi, or other IEEE 802 wireless protocols), or VHF or UHF transmission. The online access enables the subscriber to access the Internet and its myriad online sites, or to access any future network successor to the Internet.

ISP/TVP—in some instances a single entity (or providers controlled by a single entity) can provide to one or more subscribers or users both television service and online access. Such an entity is referred to herein as an ISP/TVP. Although an ISP and a TVP are represented schematically in the drawings by separate labeled boxes, the drawings are intended to encompass implementations in which the ISP and the TVP are independent entities as well as other implementations in which a common ISP/TVP provides both services.

Set-top box (STB)—a device that connects a television and a signal source. The STB receives an incoming signal, extracts content from the received signal, and transmits the extracted content to the television to be presented to a viewer. The signal source can be one or more of a computer network cable (e.g., an Ethernet or other transmission-speed cable), a satellite dish, a coaxial cable connected to a cable television system, a telephone line or digital subscriber line (DSL), a wireless network connection, an antenna (VHF, UHF, digital, or other), or another suitable signal source. The content can include, but is not limited to, video (which often can include an audio portion), audio, Internet web pages, interactive games, or other content. An STB may or may not include a dedicated television tuner. Each STB typically is assigned an identifier of some sort by the corresponding TVP, e.g., to enable the TVP to direct specific signals or programming to a specific STB, to identify the source of requests, commands, queries, or responses received from a particular STB, or for other purposes. In some instances such an STB identifier might be known only to the corresponding TVP and not available for outside communication. If the STB is connected to the Internet as a signal source (directly, through another device, or through the corresponding TVP; connected to the Internet only, or also connected in parallel to another signal source such as a cable television transmission infrastructure), the STB identifier can include an STB IP address (i.e., an Internet Protocol address). If the STB is connected to both the Internet and another signal source, the STB identifier can include an identifier specific to the other signal source in addition to the STB IP address. In some instances the STB identifier is static, while in other instances (particularly those involving an STB IP address) the STB identifier is dynamic and can change from time to time.

Despite its name, an STB need not be physically located on top of a television set literally. Under current technology, STBs often are located physically adjacent to the television set, such as in a media cabinet or the like, but it is not even necessary that the STB be located in proximity to the television. Nor is it necessary that the STB be a box, literally. Rather, a STB might be implemented, for example, as a circuit board, integrated circuit, set of integrated circuits, or software that is physically integrated with another "box," such as the television, a cable or other connection, a computer, or a building equipment or junction box, which also has other functions, or without being housed in any "box" at all.

Digital video recorder (DVR, alternatively personal video recorder or PVR)—a device that stores video content in a digitally encoded format on a digital storage medium, such as a hard drive, and enables playback of the stored content. A DVR can comprise a stand-alone unit connected to a television, a component of an STB, or a signal source, or the DVR can comprise software that programs a computer to perform DVR storage and playback functions.

Video-on-Demand (VOD)—a system that allows users to select and view video content delivered from a signal source in response to a request from the user. Typically, the requested video content can be viewed at a time of the user's own choosing and can be paused, rewound, or fast-forwarded as desired by the user. A VOD system can "stream" the content (enabling viewing of portions of a requested item of video content while other portions are still being delivered from the signal source), or the VOD system can "download" the content and allow viewing only after a complete item is delivered from the signal source. Some VOD systems allow users to select and watch video content over a network as part of an interactive television system.

Interactive Television (interactive TV, iTV, idTV, or ITV)—any television system that enables a viewer to interact with video content delivered to a television. Interactive television can include, but is not limited to, access to Web sites through TV "crossover links," electronic mail and online chat, online commerce, or enhanced graphics (relative to standard television offerings).

Internet Protocol Television (IPTV)—a system wherein television content is delivered via a computer network using Internet Protocol (IP). For residential users, IPTV is often provided in conjunction with Video on Demand and can also be bundled with Internet services such as Internet access and Voice-over-IP (VoIP). Commercial bundling of IPTV, VoIP, and Internet access is sometimes referred to in the industry as a "triple play." Additional telecommunications services (e.g., mobile voice or data service) can be added, yielding a "quadruple play" and so forth. IPTV typically is supplied by a broadband service provider using a closed network infrastructure. IPTV also can be provided over the Internet or other publicly accessible computer network, in which case it might be referred to as Internet TV or TV-over-Internet. IPTV also can be used to deliver video or other content over a corporate LAN or other business network.

Online user interface device—any user interface device used to access a remote network such as the Internet, including but not limited to a cell phone or mobile handset, a personal digital assistant (PDA), or a networked computer (desktop, workstation, notebook, laptop, or other).

Online access device—any device used to connect an online user interface device to a remote network such as the Internet, including but not limited to a modem, a wired or wireless router, a wireless access point, a wired network adapter (e.g., Ethernet adapter), a wireless network adapter (e.g., IEEE 802.11, ED-VO, EDGE, HSPA, CDMA, GSM, or other), or an optical fiber based network adapter (e.g., a network interface unit or optical network terminal). Different types of online access devices can be and sometimes are combined into a single unit (e.g., a modem that also functions as a router for a LAN). An online user interface device and an online access device can be, and sometimes are, combined into a single unit (e.g., a computer with a built-in Ethernet adapter, wireless adapter, or modem). Each online access device typically is identified on the Internet by an Internet Protocol address (i.e., an IP address; currently, under IPv4, an IP address comprises a sequence of four numbers each ranging from 0 to 255, i.e., a 32-bit address). Every transmission of data over the Internet includes a destination IP address to enable the transmitted data to reach its intended destination. In some instances an online device has a static IP address, while in other, more common instances an online access device has an IP address that is dynamic and changes from time to time. Although IP addresses are referred to herein for enabling data transmitted via the Internet to reach its intended destination, that terminology is intended to encompass any functionally equivalent online access device identifier employed to route such transmitted data to its intended destination through the Internet or through any future successor network. For example, under IPv6, 128-bit addresses will be employed.

Router—any device that acts as a junction between networks, to buffer and transfer data between or among them. For example, a router can be employed to connect a local area network (LAN) to the Internet, thereby enabling online user interface devices connected to the LAN to share a connection to the Internet through the router. The router receives data from devices on the LAN and transmits them to the Internet directed to their corresponding destinations, and receives data from the Internet and directs them to the corresponding devices on the LAN.

Modem—a device that enables online access by a user by acting as an interface between the online access provider's network transmission system and the user's computer or other online user interface device. Modems vary according to the type of provider network transmission system. Unless a specific type of modem is specified, the term "modem" shall encompass telephone modems, cable modems, DSL modems, wireless modems, satellite modems, or modems for providing online access to any other suitable network transmission system.

Cable modem—a type of modem that enables digital data transmission over cable television infrastructure. Cable modems are primarily used to deliver broadband Internet access using modulation frequencies that are not used for traditional television transmission.

Asymmetric Digital Subscriber Line (ADSL, or often DSL)—a data communications technology that enables faster data transmission over a copper telephone line than a conventional modem can provide. ADSL data transmission employs frequencies that typically are not used for voice transmission, usually frequencies beyond the range of normal human hearing (higher than about 20 kHz). Propagation of such high-frequency signals over standard copper telephone lines typically is poor, typically limiting the use of DSL to distances less than about 5 km. Once the signal reaches the telephone company's nearest central office (CO), the ADSL signal is stripped off and routed into a conventional data network, while any voice-frequency signal is routed into the conventional telephone network. That arrangement enables a single telephone line to be used for both data transmission and telephone calls simultaneously.

DSL modem—an ADSL transceiver, also known as an ADSL modem, used to connect one or more computers to a phone line to use an ADSL service. A DSL modem also can be referred to as a remote ADSL termination unit (ATU-R). An ADSL modem can also be configured to act as a router, managing the connection and sharing of the ADSL service with multiple computer or other networked devices. Such a combined device can be referred to as a DSL modem/router or similar terminology.

Digital Subscriber Line Access Multiplexer (DSLAM)—a device enabling high-speed connections between telephone lines and a computer network such as the Internet. Typically it is located at a telephone company central office (CO) and connects multiple Digital Subscriber Lines (DSLs) to a computer network, typically the Internet, using a suitable multiplexing technique.

Cable Modem Termination System (CMTS)—equipment typically found in a cable company's headend that is used to provide data communication over the cable television infrastructure, thereby enabling the cable company to offer services such as broadband Internet access or VoIP to its subscribers. To provide high-speed data services (i.e., broadband access), a cable company typically connects its headend to the Internet using high capacity data links, directly or through a network service provider. On the subscriber side of the headend, the CMTS enables data communication with each subscriber's cable modem. Various CMTSs are capable of serving different cable modem population sizes, which can range from 4,000 cable modems to 150,000 or more. A given cable company headend may have only a few CMTSs, or a dozen or more, depending on the size of the cable modem population serviced by that headend.

Dynamic Host Configuration Protocol (DHCP)—a system that automatically assigns Internet Protocol addresses (IP addresses), subnet masks, default routers, and other IP parameters, which are required for proper routing of data transmissions to or from a particular device connected to the network. The assignment usually occurs when a DHCP-configured computer, modem, router, or other device boots up or regains connectivity to the network. The DHCP client (i.e., DHCP software resident in the device) sends out a query requesting a response from a DHCP server on the network. The query is typically initiated immediately after booting up and before the client initiates any IP-based communication with other hosts. The DHCP server then replies to the client with its assigned IP address, subnet mask, domain name server (DNS), and default gateway information (referred to as "stateful" assignment). The assignment of the IP address usually expires after a predetermined period of time, at which point the DHCP client and server renegotiate a new IP address from the DHCP server's predefined pool of IP addresses. Because, under DHCP, the IP address of a given computer varies over time, various network-related functions are more difficult. For example, configuring firewall rules to allow access to or from a machine that receives its IP address via DHCP is more complicated because the IP address varies from time to time. Network administrators typically must enable access to an entire remote DHCP subnet for a particular TCP/UDP port. Such complications arise in other instances as well. Many residential routers and firewalls are configured in the factory to act as DHCP servers for home networks. A computer can also be used as a DHCP server. Internet Service Providers (ISPs) generally use DHCP to assign individual IP addresses to subscribers. DHCPv6, which is the Dynamic Host Configuration Protocol for Internet Protocol Version 6 (IPv6), enables local generation of IP addresses (i.e., "stateless" assignment). Although such stateless address auto-configuration of IPv6 substantially eliminates a prime motivation for DHCP in IPv4, DHCPv6 can still be used to statefully assign addresses if needed or desired by a network administrator. DHCPv6 can also be used to distribute information that is not otherwise discoverable, e.g., the domain name server.

User (equivalently, subscriber, viewer)—the term "user" shall be construed as one or more persons receiving online access or television service at a delivery end-point within a household, office, business, or other site or establishment served by an online access provider or television service provider. For example, delivery of an online ad to or tracking of online activity of "the user" based on viewing or other activity by the "user" related to a television advertisement might involve a single person, or one person might view a television ad while the corresponding online ad might be delivered to another person in the household, office, business, or other site or establishment. Television ads or programming can be one television set or multiple sets of a given user; likewise, online access or ad delivery can involve one or more computers or other online interface devices of a given user. In some instances, a business having multiple physical locations may be served by separate online or television services, but in other instances, a business may have an internal LAN or WAN that extends service provided to multiple physical locations. Also, some computers and televisions are portable, and can access the service provided from remote locations. Accordingly, the term "user" is intended to refer to that person or those persons who receive the provided services and does not require a fixed or single location in such instances.

Behavioral targeting—the delivery of specific advertisements to a subscriber, the advertisements being selected on the basis of activity of the subscriber, typically recent activity, including but not limited to: online or television-based searches conducted by the subscriber; content viewed or otherwise accessed by the subscriber online or on television; online or television advertisements viewed, clicked on, interacted with, or otherwise accessed by the subscriber; shopping or purchases made by the subscriber online or through a television; and any other form of previous subscriber online or television activity.

Central Ad Server (CAS)—a computer server that manages delivery of advertisements (television or online) to visitors of online sites or viewers of television programs. A local ad server can be typically run by a single publisher to serve ads to visitors of websites or viewers of television programs of that publisher, or by a single advertiser to serve ads into ad space acquired by the advertiser on various websites or television programs. A third-party or remote ad server typically is remotely located and delivers advertisements of various advertisers to visitors of websites or viewers of programs of multiple publishers. The remote ad server acts as a central conduit for delivering advertisements, enabling advertisers and publishers to track the distribution of their online or television advertisements and to control the rotation and distribution of their advertisements across the Internet or television system from one location. The advertisements can be stored on the CAS for later delivery, can be transmitted to the CAS and then delivered from the CAS upon receiving an ad request, or can be delivered from another source in response to an ad request received and routed by the CAS. Examples of third-party ad servers include DoubleClick's DART for Publishers central ad server (also known as DFP) and DoubleClick's DART for Advertisers central ad server (also known as DFA). In some cases, a CAS can be owned or used by a TVP, an ISP, an STB provider or modem provider, an online content provider, a profile aggregator, a profile distributor, an ad broker, an ad network, an ad exchange, an ad agency, an online advertiser, a TV advertiser, a TV ad space owner, or a TV content provider, representatives or proxies of any of those entities, or other entities. In some instances that CAS will operate independently of an ISP or TVP.

Profile provider—An entity that has or collects profile information that is used to target advertisements. In the context here, the profile provider cooperates with a CAS, which receives all or part of the profile information from the profile provider for use in targeting television or online advertisements. User profile information derived from online or television activity can include, for example, observed online behavior of a user accessing the Internet (e.g., viewed online content viewed or accessed, online searches performed, online purchases made, or times and dates of such behavior), observed viewing or interaction behavior of a television viewer (e.g., television programs or ads viewed, responses to interactive programs or advertisements, or times and dates of such behavior), or demographic information collected from an Internet user or television viewer.

Examples of profile providers can include, but are not limited to, any entity that owns or uses: (1) a visited Internet site server; (2) a server delivering content, images, audio, video, text, or any combination directed to an online user interface device (such as a computer or other online interface device) via an online access device (such as a modem or router), either directly or indirectly (e.g., via a redirect); (3) a server delivering content, images, audio, video, text, or any combination directed to a television via a set-top box; (4) a server delivering an ad to an online user interface device via an online access device on behalf of an advertiser or an ad network; (5) a server delivering a television ad to a television via a set-top box on behalf of an advertiser or an ad network; (6) a server recording an activity conducted from an online user interface device such as a click on an ad or a link to an ad, a viewing of an ad, a click on a link to particular content, a search, a request for product information, receipt of particular content, a product purchase, a telephone call made, or any other selected and definable user activity; (7) a server recording an activity conducted through a user's television such as a click on an ad or a link to an ad, a viewing of an ad, a click on a link to particular content, a request for product information, receipt of particular content, a product purchase, or any other selected and definable user activity; or (8) a server facilitating instant messages or any other kind of communication on behalf of the user.

Another example of a profile provider is: (9) a company sponsoring and having access to a program located on the user's computer or other online user interface device or on the user's set-top box that can observe the user's online or television activity (with the user's permission), such as a browser toolbar or desktop search software. A profile provider, broadly, can be: (10) any entity able to collect behavioral profiles (observed online activity or observed viewing or viewing-related activity) or demographic profiles (provided by the user), typically including a device identifier (e.g., a set-top box identifier or an online access identifier) used when the profile was observed or collected and the date and time the profile was observed or collected, regardless of whether or not the entity collected a given profile directly through contact with the user's computer or television or indirectly from another entity such as those listed in this paragraph. In some cases, a user's online or viewing activity will result in direct contact between the television (via a set-top box) or the online user interface device (via an online access device) and the profile provider, e.g., if the profile provider is an online commerce site, the user makes a purchase at the site, and the online commerce site generates a profile for that user. In other instances there may be no direct contact between the profile provider and the user, e.g., if the user makes a purchase at an online commerce site that in turn reports information pertaining to the user to the profile provider. In some situations, also, a profile provider might also own or otherwise control a CAS, in which case user profiles can be immediately available to the CAS without need for transmission between separate entities.

Profiles or partial profiles provided by a profile provider to a CAS can contain any quantity of profile information, such as, in one example, just an online access IP address or set-top box IP address or other STB identifier used by a person at the time his profile was collected and the identity of the profile provider. The profile can include, e.g., a profile identifier or profile name, a username, or a login ID; the profile can be referenced by or included in a cookie or tag placed on a user's STB or online user interface device. The IP address can be provided by the profile provider itself or might be obtained by the CAS when a user engages in any online or television activity or provides an item of demographic information and is redirected by a profile provider to the CAS. In another example, a profile can be more extensive and can include demographic or behavioral information, such as an extensive browsing history, shopping or purchase histories, content or programs viewed, and other information concerning the user's characteristics or the user's activities. In some instances a profile includes PII; in other instances it does not. Although the profile provider is an entity, many or most of the actions attributed to the profile provider are actually performed by equipment under the administrative control of the profile provider, such as computers, servers, software running on those computers or servers, network connection hardware or software, or other equipment. Such actions may still be characterized as being performed "by the profile provider," whether performed automatically, semi-automatically, or manually.

Personally Identifiable Information (PII)—information that can be used to identify a specific person, including but not limited to: name, Social Security number (SSN), date of birth, street address, email address, static IP address (if any), phone number (home, work, wireless), financial account numbers (bank accounts, credit accounts, or any other financial data), driver's license number, vehicle registration number, vehicle license number, facial photographs, fingerprints, handwriting or signature, or any other information that can assist in identifying a specific person.

Non-Personally-Identifiable Information (non-PII)—information about a person that typically cannot be used to specifically identify that person, including but not limited to: city, state, or country of residence, age, gender, race, ethnicity, school or workplace (if sufficiently large), salary or income, hobbies, dynamically assigned IP addresses, online sites visited, online searches conducted, or other information that is useful to know about a person but does not by itself allow one knowing the information to identify the particular person.

Cookie—a text file placed on a user's computer by a server that also serves content to the user's computer using browser software. The cookie typically can be read or altered only by a server operating under the same Internet domain as the server that originally placed the cookie. The cookie file can be used to identify a computer that has already been in contact with the same domain and can also be used to store PII or non-PII pertaining to a user of that computer. In a first example, a cookie can store non-PII such as previous searches conducted at the site, or pages viewed or visited at the site, by the computer user. In a second example, a cookie can be used to store a username used by the user to access a site, customized preferences of the user, or various pieces of PII. It should be noted that a cookie file can also be created, altered, or deleted by software located on the user's computer.

Television advertisement (TV ad)—a full screen video ad, a partial screen video ad, a banner ad, a text ad, an audio ad, or any other form of advertisement suitable for delivery to and visual or audible presentation by a television set.

Various systems and methods are used currently for targeting advertisements based on user, viewer, or customer behavior. Some of those may rely on the collection of personally identifiable information (PII) to enable correlation of the person exhibiting the behavior and advertisements targeted at that person; in others, advertisements can be targeted without collecting PII. In those latter examples it is often the case that the medium of the behavior and that of the advertisement are the same. For example, many grocery stores hand out so-called "club cards" that need not be linked to PII. A shopper presents the card at checkout to receive various discounts, thereby allowing the store to link the list of purchased items to the card. As the system "learns" the shopper's purchasing habits, the system begins issuing coupons targeted at purchases that the shopper has made previously or that the system predicts the shopper may wish to make based on past purchases. In another example, online advertisements are readily targeted based on an Internet user's online activities without using PII. The use of cookies enables an ad server to recognize an Internet site visitor who has been previously presented with ads by the ad server or who has conducted searches or accessed content at sites linked to the ad server. The ad server can target future advertising to the site visitor based on that previous activity. A user who has searched for airline tickets to southern California on an online travel site, for instance, can later receive targeted online advertisements for Disneyland, delivered perhaps while visiting some other online site, to the user's computer from an ad server that collected the user's search information from the online travel site.

Regardless of whether PII is used or not, targeting advertising in one medium based on activity in another can be problematic. Various schemes currently are implemented, under development, or being considered wherein PII is used, e.g., to target television advertisements based on a viewer's online behavior. Some of those schemes involve agreements or alliances among television providers, online access providers, online search portals, or online sites. The PII has typically been required to make the connection between the different media, because different devices are typically employed to access each one. Other proposed schemes would enable targeting of television ads based on observed online behavior without requiring the use of PII (e.g., application Ser. No. 11/736,544 cited above). Whether or not PII is used, however, the prevalent use of dynamic device addresses, e.g., for enabling online access, creates significant technological impediments to cross-media targeting of ads.

Tracking and recording user behavior in one medium in response to observed behavior in another is also a desirable goal. Such capability can enable an advertiser to target future ads more accurately, to evaluate the effectiveness of particular ads or ad campaigns, or for other purposes. However, the same issues (e.g., use of PII or not, dynamic device addresses) that must be addressed for cross-media targeting must also be addressed for cross-media tracking.

It is therefore desirable to provide systems and methods for delivering targeted online advertisements to television viewers based on their television viewing or interacting behavior, with or without using PII to link a user's television and online activities, that can be implemented despite the use of dynamic device addresses for the user's online access or television service.

SUMMARY

In a computer-implemented method, a selected online advertisement is automatically directed to, or online activity is automatically tracked and recorded from, an online user interface device. That online user interface device corresponds, at the time the advertisement is directed or the activity is tracked, to a first online access identifier. The advertisement is directed or the activity is tracked based on information from a user profile, which user profile references or includes a first set-top box identifier. That information is derived at least in part from automatically collected data related to user behavior with respect to at least one television advertisement delivered to a set-top box, which set-top box corresponds, at the time of that user behavior, to the first set-top box identifier. The first online access identifier is associated with the first set-top box identifier.

In some implementations, the online access identifier and the set-top box identifier can be associated by each being referenced or included in the user profile. In some implementations, the online access identifier and the set-top box identifier can be associated in a database.

In some implementations, the online advertisement, or the tracked and recorded online activity, can be linked to the delivered television advertisement in a database.

In some implementations the observed user behavior can include user interaction responsive to the delivered television advertisement or the observed user behavior can include user commands executed during presentation of the delivered television advertisement.

In some implementations, the first set-top box identifier includes a tag or a cookie placed on the set-top box, or the first online access identifier includes a tag or cookie placed on the online user interface device. In some implementations, the first set-top box identifier includes a set-top box IP address, or the first online access identifier includes an online access IP address. In some implementations, the profile information includes a profile identifier that is referenced or included in a tag or a cookie placed on the online access user interface device, or is related to a username or logon ID provided by the user. In some instances profile information can be derived at least in part from automatically collected data related to user behavior with respect to previous online activity from an online user interface device corresponding, at the time of the previous online activity, to at least one online access identifier related to the first user profile information or electronically associated with the first set-top box identifier.

In some implementations, the first online access identifier can include a first online access IP address. In various instances an electronic association of the first set-top box identifier and the first online access IP address can be: received from at least one provider of television service or online access to the user, established by a common IP address for the set-top box and the online user interface device, or established using a database of set-top box identifiers, online access IP addresses, and corresponding times and dates. In such implementations, a cookie or tag subsequently placed on the online user interface device can act as the online access identifier, instead of or in addition to the online access IP address.

Objects and advantages pertaining to delivery of targeted online advertisements based on television viewing or interacting behavior may become apparent upon referring to the exemplary embodiments illustrated in the drawings and disclosed in the following written description and/or claims.

BRIEF DESCRIPTION OF THE DRAWINGS

FIGS. 1-9 illustrate schematically a system for targeting online advertisements based on television viewing or interacting behavior.

Specifically, FIG. 1 depicts an example system with a user's modem (an online access device) connected to an Internet service provider (ISP) for providing online access via a computer (an online user interface device), and that user's set-top box (STB) connected to a television provider (TVP) for providing television service via a television (TV).

FIG. 2 depicts an implementation in which the modem IP address is shared by the STB.

FIG. 3 depicts a user of the example system of FIG. 1 engaging in an example online activity, namely accessing an online site.

FIG. 4 depicts the electronic delivery, from the accessed online site to a central ad server (CAS), of a portion of the user profile information derived from the user's online activity from the online access IP address.

FIG. 9 depicts a case of an online user interface device that is a mobile device (e.g., an Internet-enabled cell phone, handset, PDA, or laptop computer) that is intermittently disconnected from the modem and connected to the Internet through another connection (e.g., another LAN, a wireless hotspot, or a cell phone network).

Figure 1:
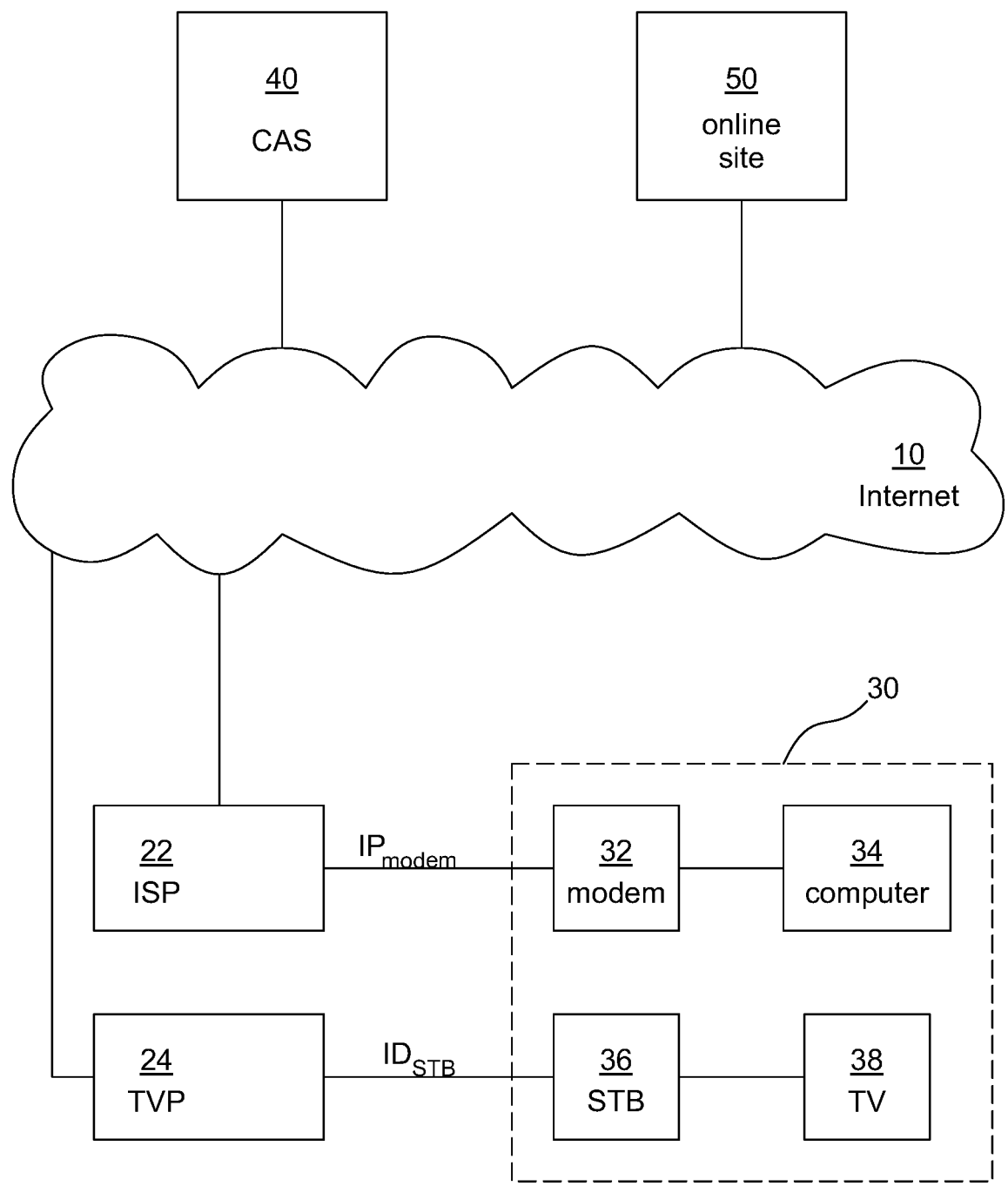

The embodiments shown in the figures are exemplary and should not be construed as limiting the scope of the present disclosure and/or appended claims.

DETAILED DESCRIPTION OF EXEMPLARY EMBODIMENTS

The disclosed exemplary systems and methods enable delivery of targeted online advertisements or tracking and recording of online behavior based on television viewing or interacting behavior. Specific user profile information related to a first set-top box identifier is derived at least in part from observed user behavior related to at least one television advertisement delivered to a set-top box corresponding, at the time of the observed user behavior, to the first set-top box identifier. Responsive to that user profile information, (i) a first selected online advertisement is directed to an online user interface device corresponding, at the time the online advertisement is directed, to a first online access identifier, or (ii) selected online activity is tracked and recorded automatically from an online user interface device corresponding, at the time of the tracked and recorded online activity, to a first online access identifier. The selected online advertisement or the tracked and recorded online activity can be linked in a database to the delivered television advertisement. The first online access identifier is related to the user profile information or electronically associated with the first set-top box identifier. Depending on the specific implementation, the user profile information or the electronic association of online access and set-top box identifiers may or may not include personally identifiable information.

The user profile information, online access identifiers, or set-top box identifiers can be related or electronically associated for many or all of the users of a multitude of users before directing online ads to any of the multitude of users. Alternatively, the user profile information, online access identifiers, or set-top box identifiers can be related or electronically associated for one or a few of a multitude of users at any given time as needed for directing online ads to users, with additional user profiles and identifiers related or electronically associated at later times for directing other online ads to additional users. The relations or electronic associations can include one or more of (i) an earlier online access identifier and a later set-top box identifier, (ii) an earlier set-top box identifier and a later online access identifier, or (iii) contemporaneous online access and set-top box identifiers. Such differing relations and associations can become necessary, e.g., as IP addresses are assigned and reassigned under DHCP.

The multitude of users can be any set made up of a large number of users and does not necessarily include every user having online access or television service through a particular company or provider. For example, the system described can operate only with respect to a subset of users, such as those users who have capabilities needed to implement this system (e.g., suitable hardware, software, or operating system), those who have done some sort of subscription, or those selected based on criteria as to which operation of the system is considered desirable, less expensive to implement, or profitable. For example, those users might be chosen that have STBs with an operating system, software, or hardware capable of accepting TV ads from a CAS. In any event, the fact that other users may exist as to which the system does not operate is not intended to negate the advantages of the system as to those users for which the system does operate.

Exemplary systems for implementing the various methods disclosed herein is illustrated schematically in FIGS. 1-8. As shown in FIG. 1, a user's modem 32 (an online access device) is connected to Internet service provider (ISP) 22 for providing online access via computer 34 (an online user interface device), and that user's STB 36 is connected to television provider (TVP) 24 for providing television service via television 38. In some instances online access device 32 and online user interface device 34 are integrated in a single unit, while in other instances they comprise separate units. Likewise, in some instances set-top box 36 and television 38 are integrated in a single unit, while in other instances they comprise separate units. ISP 22 can offer Internet access via any suitable online access device 32 (a modem, router, or network adapter suitable for connecting to cable, DSL, wireless, satellite, Ethernet, or any other transmission system). Modem 32 and computer 34 are described only as specific examples of online access and interface devices, respectively; the use of those specific examples shall not be construed as limiting the scope of the present disclosure or appended claims. Although ISP 22 and TVP 24 are represented schematically in the drawings by separate labeled boxes, the drawings and examples are intended to encompass implementations in which the ISP and the TVP are independent entities as well as other implementations in which a common ISP/TVP provides both services. In any of the disclosed implementations, an online access IP address ($IP_{modem}$) is assigned to modem 32 in any suitable way by ISP 22 (for example, as described above). At any given time, any data or content directed for online transmission to the user is directed to the online access IP address ($IP_{modem}$) assigned to modem 32 at that time. $IP_{modem}$ can be static, but it is more typically the case that $IP_{modem}$ is dynamic, and changes from time to time as each new online access IP address is assigned to the user's modem 32 (by DHCP or other suitable means).

Figure 2:
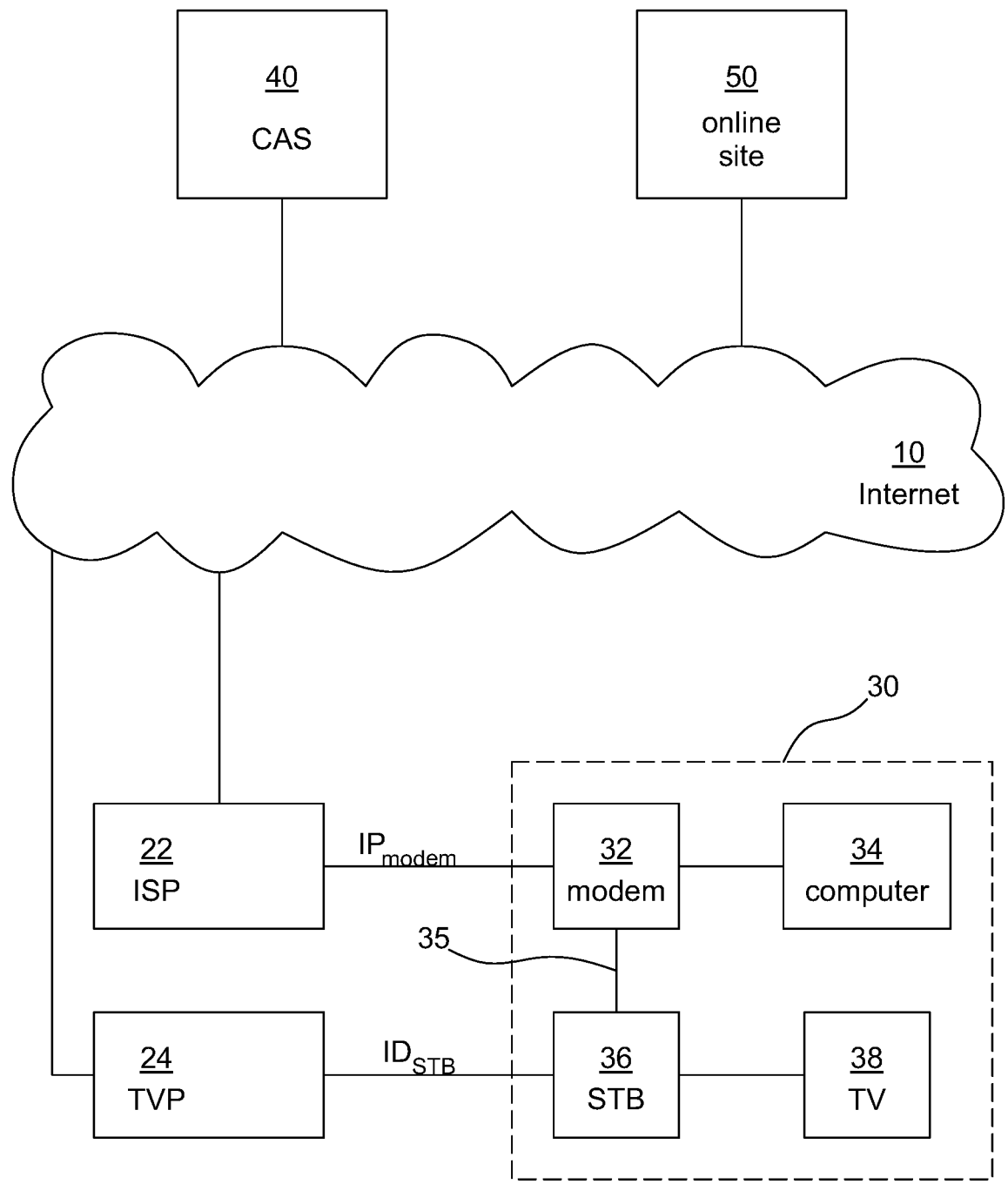
Figure 3:
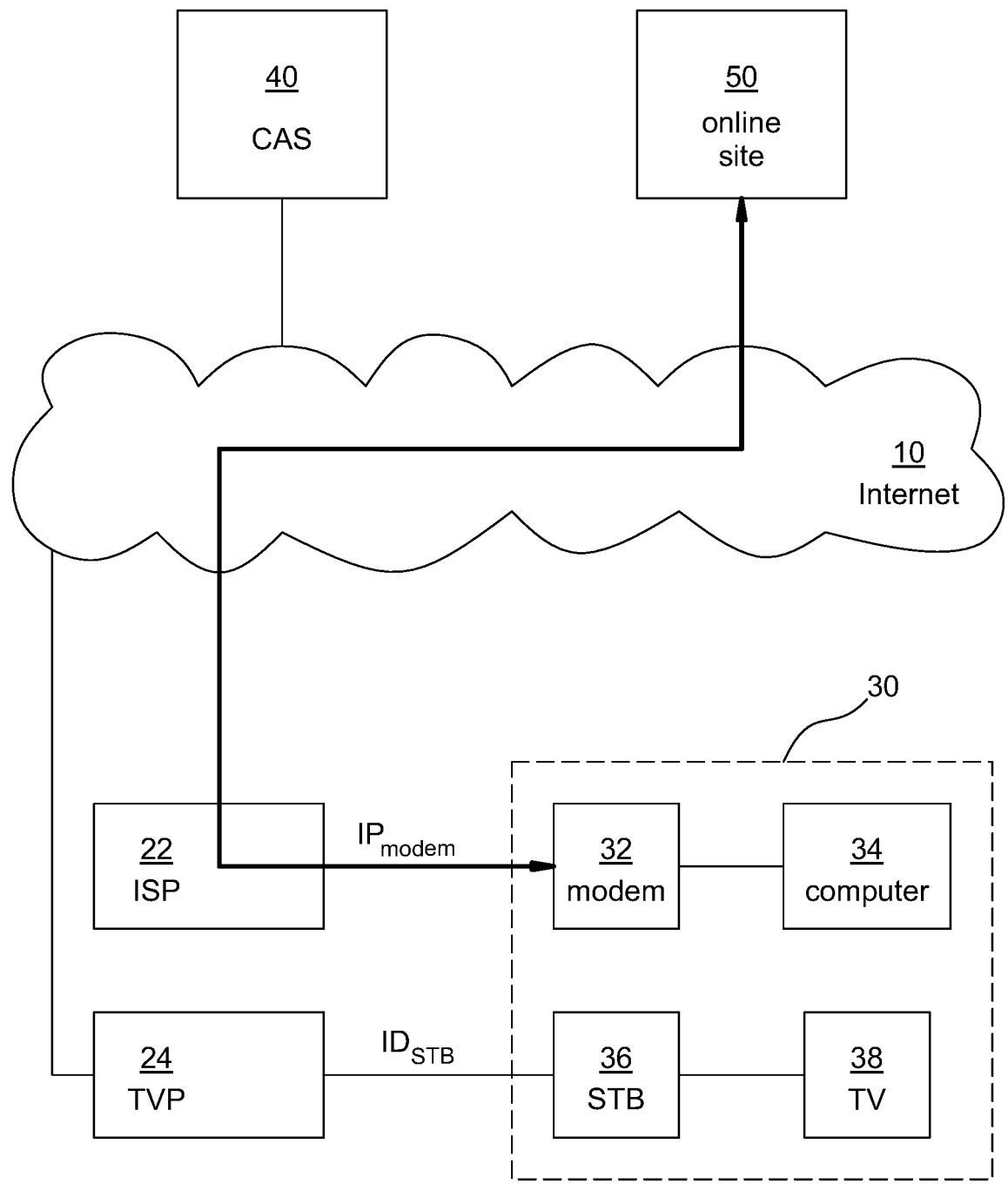
Figure 4:
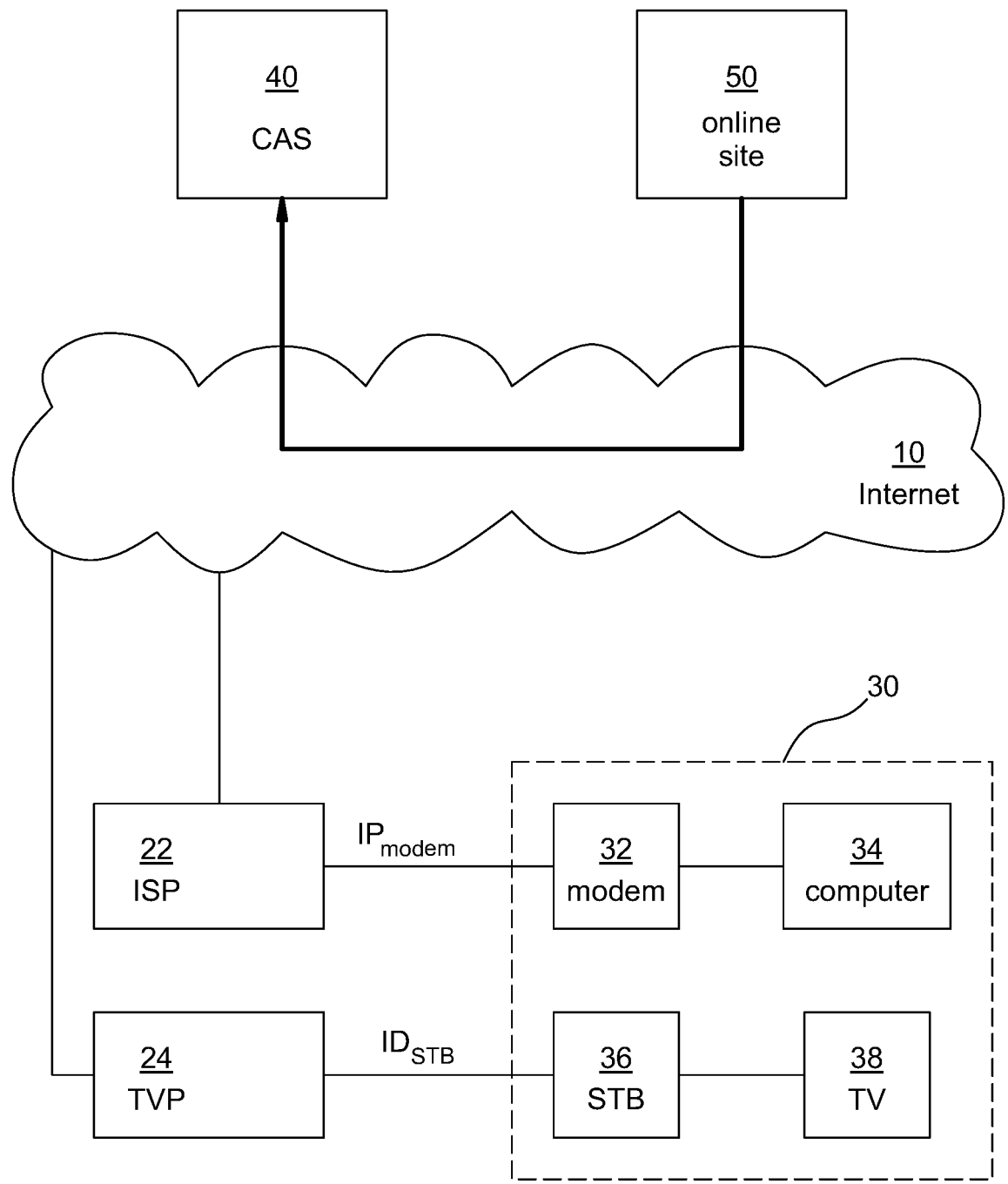

The set-top box identifier can assume more varied forms, which can be employed alone or in any of various suitable or desirable combinations. In some television transmission systems, particularly those that employ set-top boxes with only limited functionality (and perhaps no networking functionality), each set-top box might be assigned an internal identifier (static or dynamic) operative only within the scope of the television transmission infrastructure of TVP 24, but without direct access to or from any outside server, network, or system. TVP 24 mediates any exchanges of data or content between the set-top box 36 and any outside server or system (such as central ad server CAS 40, for example). In some television transmission systems, STB 36 might be provided with Internet access via TVP 24, in which case the STB 36 is assigned an STB IP address (static or dynamic) by TVP 24. In some television transmission systems, STB 36 might be provided with Internet access through its own modem (separate from modem 32) via ISP 22 or TVP 24 (which would assign the corresponding STB IP address, statically or dynamically). In some implementations, in addition to the connection between STB 36 and TVP 24, a connection 35 between the user's modem 32 the user's STB 36 enables the STB 36 also to obtain online access via the same IP address as the user's online access (i.e., via modem 32, as shown in FIG. 2). In that arrangement, the modem IP address is the only IP address "seen" by other servers or computers communicating via the Internet with the user's computer 34 or STB 36 via modem 32. In future embodiments, e.g., after future implementation of IPv6, the modem 32, computer 34, or STB 36 can each have a uniquely assigned IP address (or analog thereof) directly accessible to other servers on the Internet. Such future implementations are intended to fall within the scope of the present disclosure. In any implementation in which the STB has an IP address, the STB can exchange data with or receive programming or content from another server or system (such as CAS 40) via the Internet, in addition to any direct transmissions between STB 36 and TVP 24.

In one implementation of systems and methods according to the present disclosure, user profile information is derived at least in part from earlier online activity performed using a user's computer 34 at the user's online access IP address through modem 32. When a user engages in online activity (for example, accessing online site 50, as in FIG. 3), the online site 50 can generate a user profile that can include, e.g., a profile identifier and the user's online access IP address ($IP_{modem}$) that corresponds to the modem 32 at the time the online site is accessed. In one example, the profile identifier can be transmitted to the user's computer 34, e.g., for storage as a tag or a cookie. In another example, the profile identifier can be a username, login name, or other suitable identifier associated with the user, any of which may or may not be stored on the user's computer 34 depending on the specific implementation. Any one or more among the profile identifier, username, login ID, cookie, online access IP address, and so forth can serve as an online access identifier or a portion thereof. A portion of the user profile information derived from the user's online activity from the online access IP address, including the profile identifier or online access identifier, can be delivered electronically to a central ad server (CAS) 40 (from the accessed site 50 as in FIG. 4, or from another profile provider). A targeted television advertisement is selected by CAS 40 based at least in part on the delivered profile information.

Figure 5A:
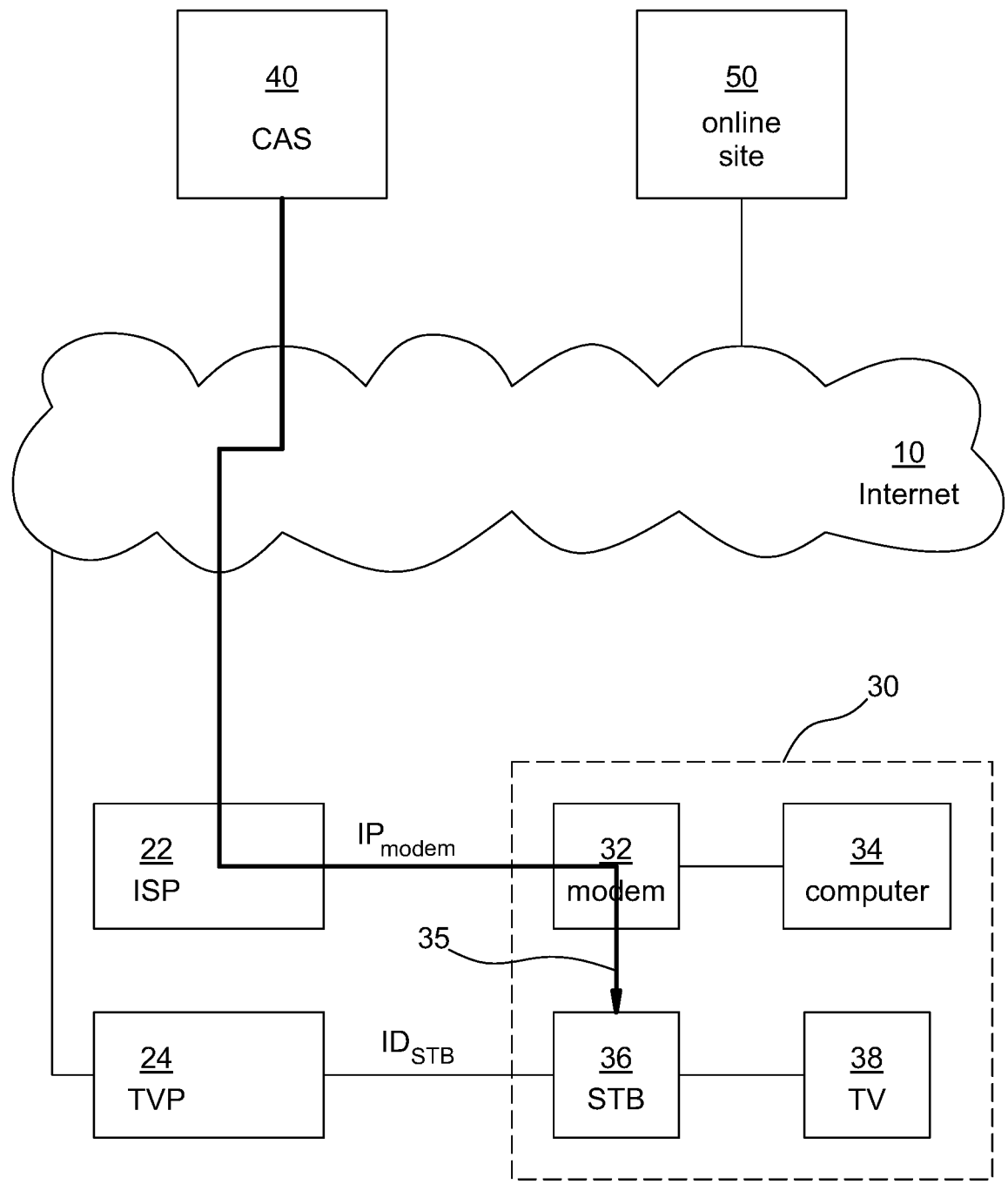
FIG. 5A depicts a targeted television advertisement being directed to the user's STB via the ISP where the modem and STB share an online access IP address.
Figure 5B:
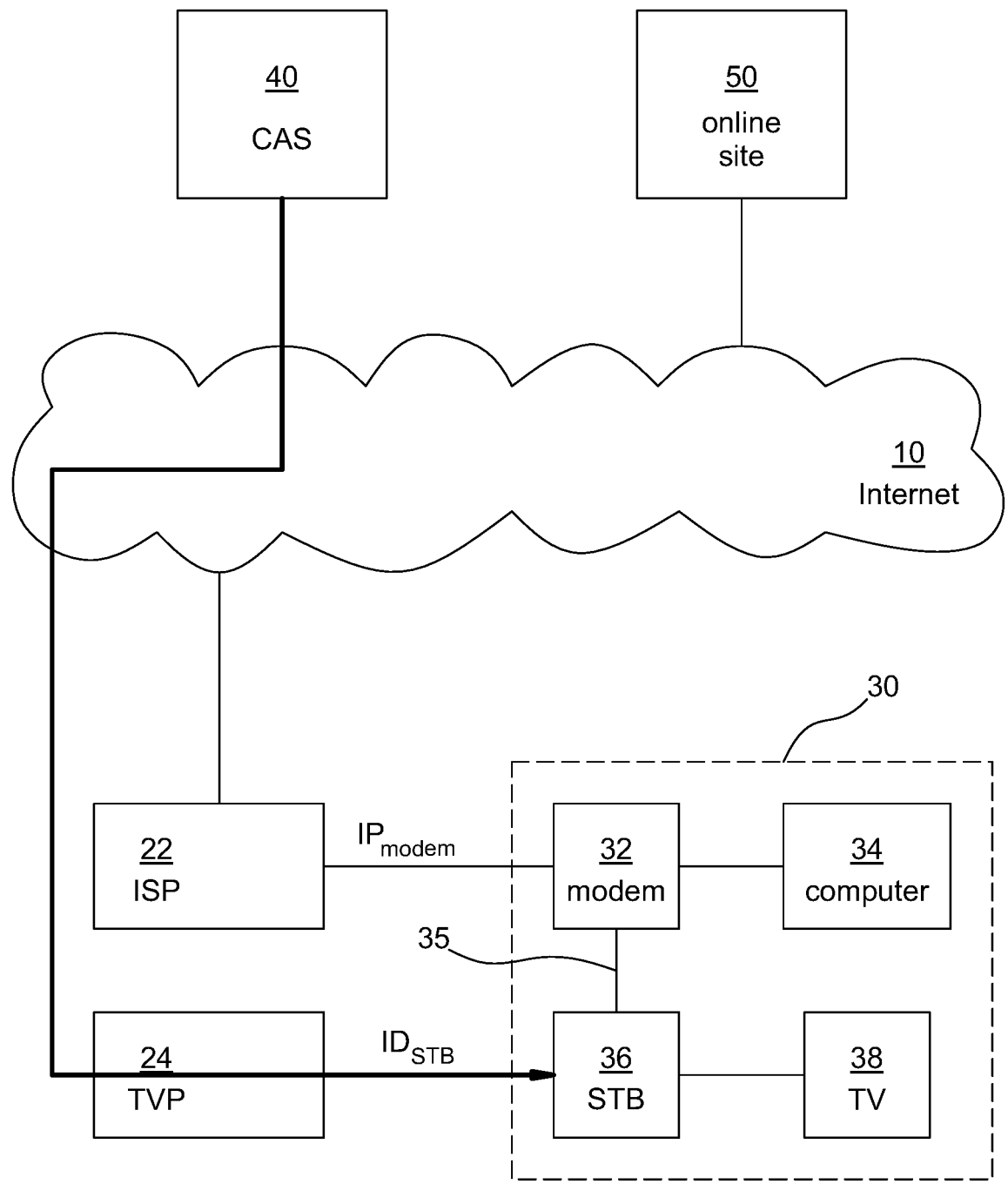
FIG. 5B depicts a targeted television advertisement being directed to the user's STB via the TVP using an associated set-top box identifier.
Figure 6A:
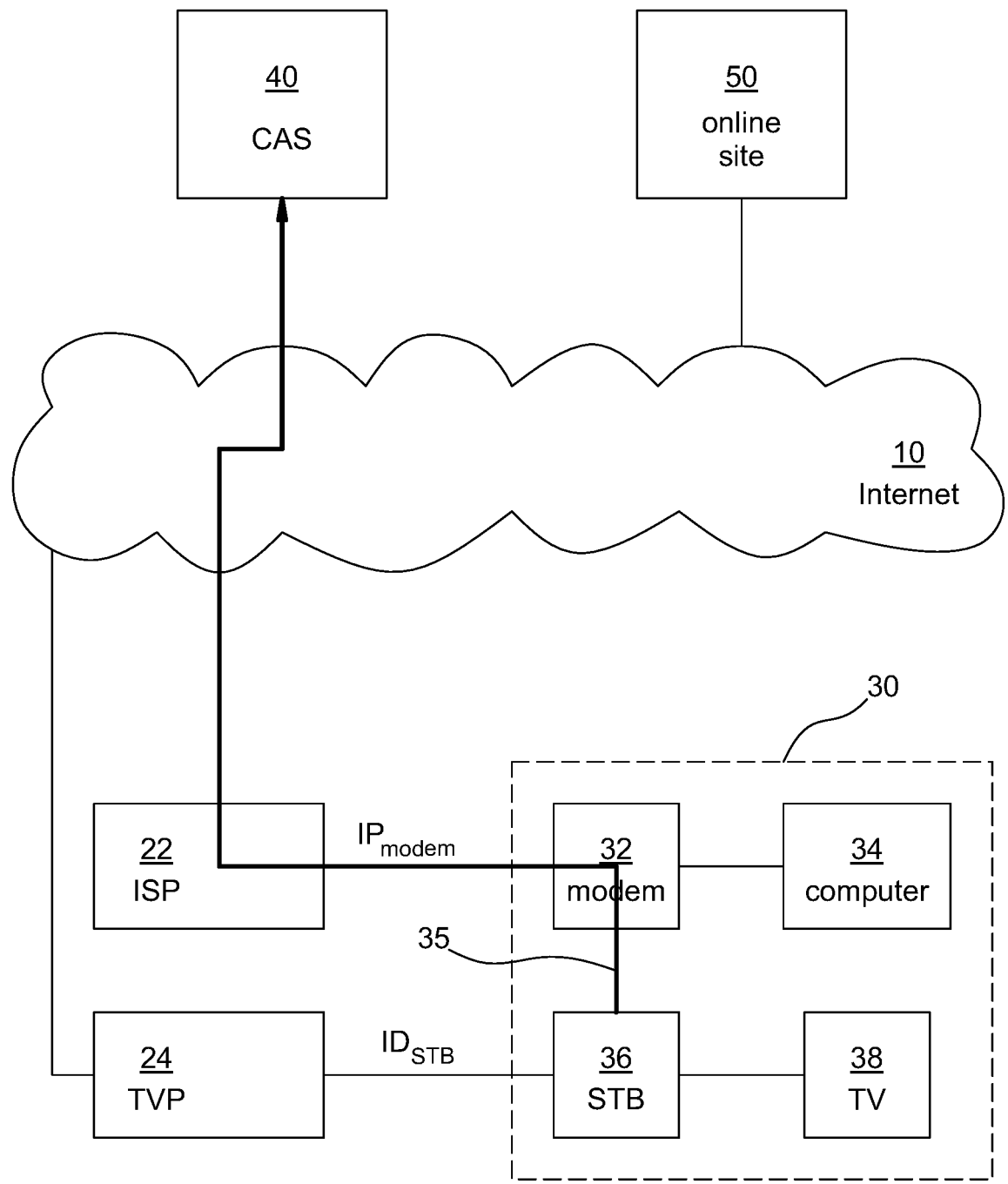
FIG. 6A depicts a notification, in response to presentation of a targeted ad or occurrence of a specified interaction, that a targeted TV ad has been presented or interacted with, being transmitted from the user's STB to the CAS via the modem and ISP.
Figure 6B:
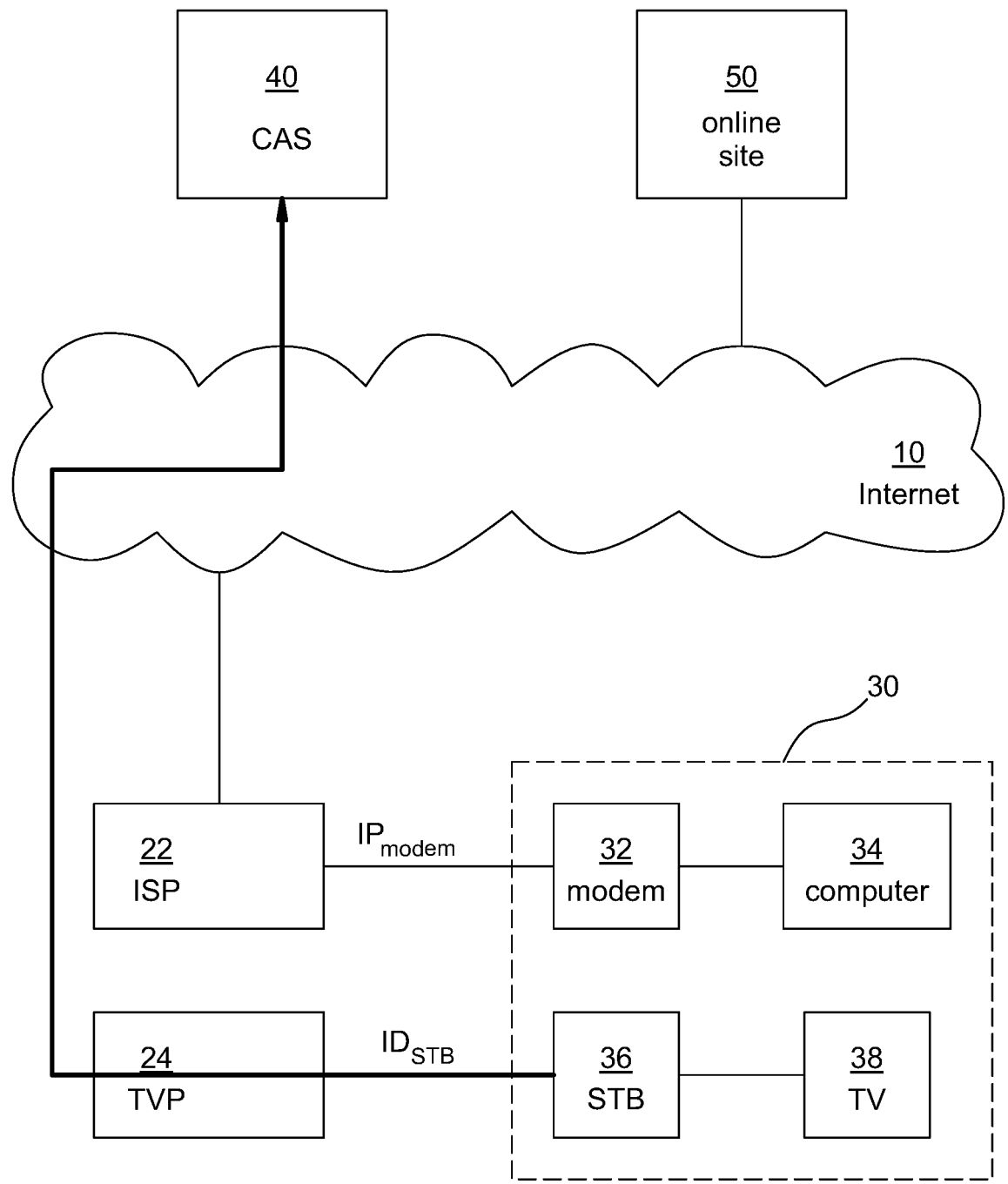
FIG. 6B depicts an alternative of the notification being transmitted from the user's STB to the CAS via the TVP.
Figure 6C:
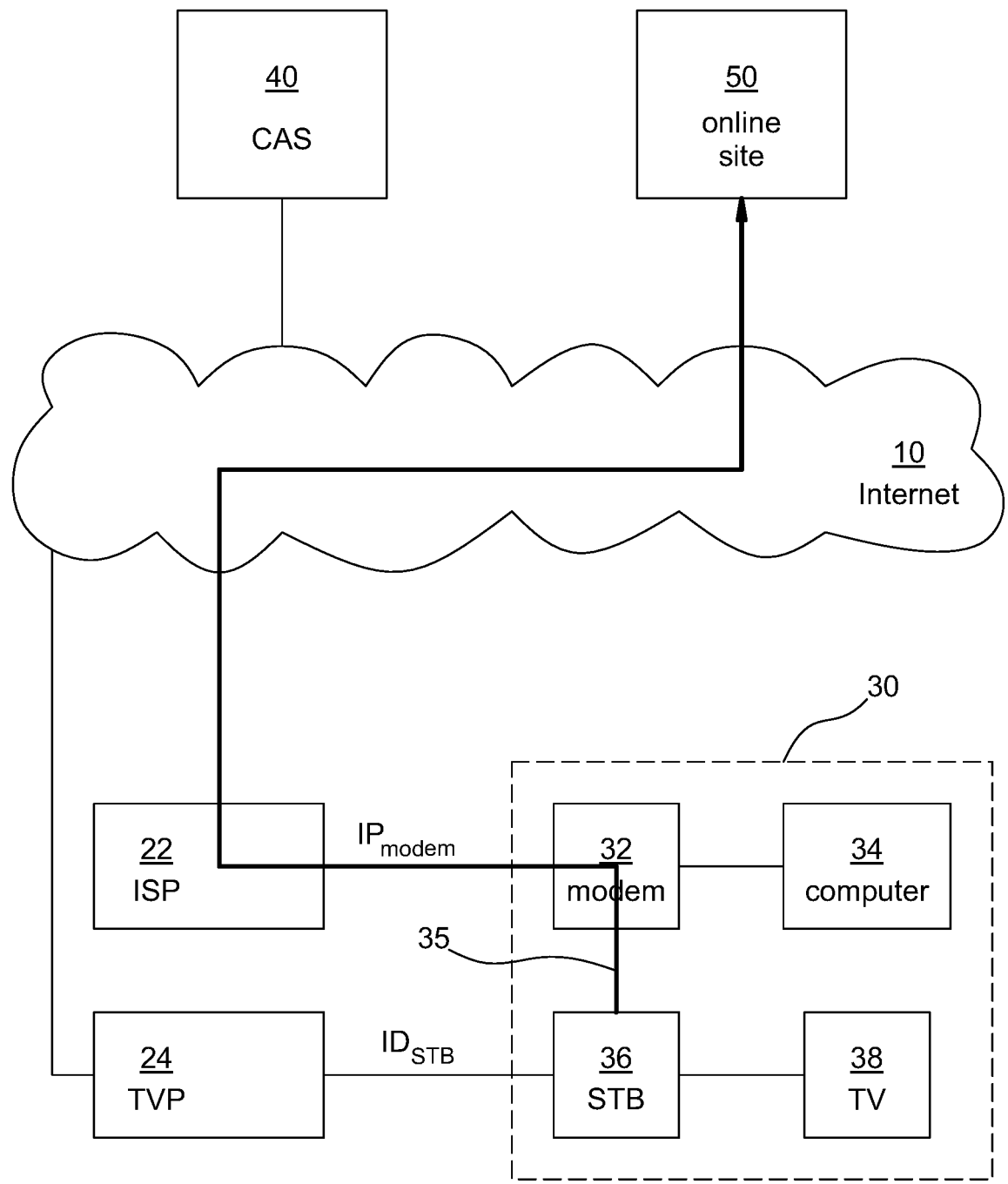
FIG. 6C depicts an alternative of the notification being transmitted from the STB to the online site via the modem and the ISP.
Figure 6D:
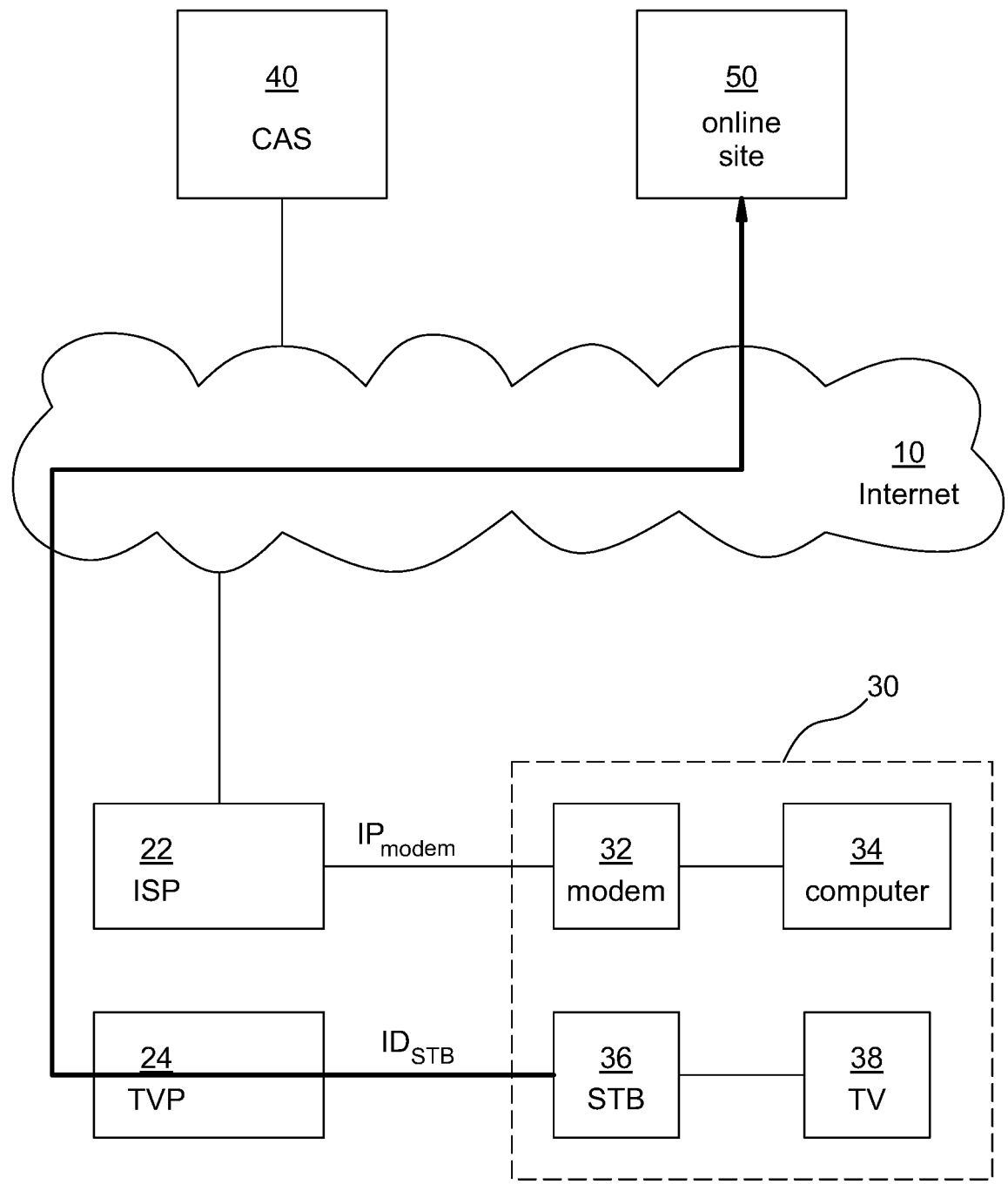
FIG. 6D depicts an alternative of the notification being transmitted from the STB to the online site via the TVP.

The targeted television advertisement is directed to the user's STB 36 via ISP 22 if modem 32 and STB 36 share the online access IP address $IP_{modem}$ (as in FIG. 5A), or via TVP 24 using an associated set-top box identifier $ID_{STB}$ (as in FIG. 5B). The association between the online access IP address for the earlier online activity and the STB identifier can be established for targeting the television advertisement in any suitable way, including but not limited to those disclosed in application Ser. No. 11/736,544, already incorporated herein by reference. For example, the association between the online behavior from $IP_{modem}$ and subsequent delivery of the targeted ad to $ID_{STB}$ can be established by: use of PII or non-PII as needed, desired, or permitted; use of a common identifier or user pseudonym for a user's modem and set-top box by an ISP/TVP; use of a common online access IP address used by both modem 32 and STB 36; cooperation between the ISP, TVP, and/or CAS to associate $IP_{modem}$ and $ID_{STB}$, with or without using PII; and so on.

Once requested, the delivery of the targeted television advertisement to the user's STB 36, depicted in FIGS. 5A and 5B, can be achieved in a variety of ways. The advertisement can be pre-stored on CAS 40 and transmitted directly from CAS 40 to the user's STB 36 (as in FIGS. 5A and 5B). The advertisement can be pre-stored on CAS 40 by virtue of it having been transmitted (i) from the accessed online site 50, (ii) from another online site, (iii) from another ad server, ad network, ad exchange, or advertiser, or (iv) from another entity. In the cases where the advertisement has been transmitted to, and stored on, CAS 40 from a site other than accessed online site 50, the transmission can be accomplished through a transmission request from accessed online site 50. Alternatively, the targeted television advertisement can be transmitted directly to the user's STB 36 from accessed online site 50 or from another online site or ad server (neither of these alternatives is shown), without the pre-storing step onto CAS 40. In another case, the user's STB 36 can be instructed by CAS 40 to retrieve the advertisement directly from accessed site 50, from CAS 40, from another online site, or from another ad server, using for example the URL given to the CAS 40 by the profile provider. In any of the alternatives, the television advertisement need not be transmitted directly to STB 36; instead it can be transmitted through one or more intermediate servers (i.e., a server hosted by an ISP, a TVP, a cable company, or a telecommunications company, for example). The television advertisement can be streamed or otherwise delivered for real-time viewing, or it can be delivered to the user's STB 36 or an associated DVR for later viewing.

CAS 40, online site 50, or another profile provider can transmit (directly or indirectly) to STB 36 instructions to provide a notification when the targeted television advertisement is presented on the user's television 38 (as a result of the earlier, observed user online behavior), or to provide an opportunity for the user to interact with the targeted television advertisement (to observe user behavior after the targeted television advertisement is delivered). Such interactions can include any of a wide variety of queries, responses, or actions. In one example, the viewer might be asked whether the advertisement was relevant or whether the user wishes to receive additional ads of the same type or from the same advertiser. In another example, the user might be asked to choose among alternative products about which further information or advertisements are available. In another example, a user might be given an opportunity to shop or make a purchase through the television advertisement. In another example, the viewer might be asked whether he or she wishes to release certain PII to the advertiser. In response to presentation of the targeted ad or occurrence of the specified interaction, the notification that a targeted TV ad has been presented or interacted with is transmitted from the user's STB 36, or from a server that participated in or is aware of the delivery of the television ad to STB 36, to CAS 40 (for example, via modem 32 and ISP 22 as in FIG. 6A or via TVP 24 as in FIG. 6B; in either case perhaps also via one or more intermediate servers). The notification can include the profile identifier included with the original advertising request received by CAS 40. Alternatively, the notification can be transmitted from STB 36 to online site 50 (directly, via modem 32 and ISP 22 as in FIG. 6C or via TVP 24 as in FIG. 6D; or indirectly via CAS 40, not shown). The notification can merely indicate that the television advertisement has been viewed, or can include more extensive information derived from the user's behavior related to the television advertisement (before, during, or after its viewing).

Later, when the user again accesses one or more online sites through modem 32, the profile identifier can be transmitted to CAS 40 (e.g., by reading the cookie or tag stored by computer 34, or by receiving a username, login name, or other suitable online access identifier). In response, CAS 40 can transmit one or more selected (i.e., targeted) online advertisements to the user's computer 34 via modem 32 at its current online access IP address or can track and record the user's online activities via modem 32 at that current online access IP address (as in FIG. 7A). The current online access IP address for modem 32 may or may not be the same as that used to initially access online site 50. The selected online advertisement can be targeted based on any suitable or desirable criteria, including observed user behavior related to the television advertisement directed to STB 36.

Alternatively, the profile identifier can be transmitted to online site 50 (directly, as in FIG. 7B; or indirectly via CAS 40 or other intermediate server, not shown) or to another ad server (not shown) in a manner similar to that described above for CAS 40. In response, online site 50 or the other ad server can transmit one or more selected online advertisements or selected online content to the user's computer 34 or can track the user's online activities (directly, as in FIG. 7B; or indirectly via CAS 40 or another server, not shown).

In various alternative implementations, instructions for online ad delivery or online tracking are not necessarily transmitted (e.g., by CAS 40 or other ad server, by online site 50 or other online site, by an ISP or a TVP) in real time, nor are they necessarily transmitted electronically via a network. In some implementations, instructions are transmitted continuously as notifications are received, are transmitted only at certain time intervals or upon occurrence of certain events, or are transmitted only upon accumulation of a prescribed number of received notifications. Those instructions can be transmitted immediately over the Internet or other network by any suitable protocol (e.g., TCP/IP), can be transmitted via email, can be stored on a digital storage medium that is physically transported, can be delivered as hardcopy printout, or can be delivered by any other suitable or desired means.

The profile provider (e.g., the proprietor of online site 50) or another online entity (that uses or benefits from use of the profile information) can send an electronic communication to CAS 40, preferably automatically, such as by having the profile provider's server pre-programmed to send such electronic communication, which electronic communication contains instructions or information useful to CAS 40 in causing a selected online ad to be transferred to the online user interface device 34 at the proper time or in causing tracking of online behavior from the online user interface device 34 to occur. The electronic communication received by CAS 40 can contain information or instructions related to possible user behavior related to the targeted television advertisement. The electronic communication can take a variety of forms, and can include, but is not limited to, one or more of: (1) an indicator of which online ad that should be transmitted, such as a URL or ad title given by the profile provider to retrieve the correct online ad from a corresponding ad server, or the actual online ad itself; (2) an indicator of information about the user (likely not PII), such as profile information or a code or keyword to access that information in a database, online access identifiers, STB identifiers, IP addresses, times and dates of online site visits or television ads viewed, (3) an indicator describing user activity (previous ads viewed or interacted with) or user interests, or (4) responses desired of CAS 40 dependent upon user activity related to the delivered television ad (e.g., "if the user chooses 'A', deliver online ad 'X'" or "if the user sees television ad 'B', track online behavior at online domains 'Y' and 'Z'"). The electronic communication can be sent for each instance of a user viewing or interacting with a television advertisement, or a list can be created and transmitted at suitable intervals containing information about a number of such television ads. In some instances, the electronic communication can be delivered before the corresponding television ad is delivered, with the instructions in the communication to be executed after delivery of the television ad.

The tracking of online activity that is enabled by the association of an STB identifier with an online access identifier (using an online access IP address as described above or by other methods such as those described below) can allow an advertiser to evaluate the effectiveness of the television advertising or to refine targeting criteria for the online or television advertising. The presentation of targeted online advertising as a follow-up to targeted television advertising that is enabled by the association of the STB identifier with the online access identifier (using an IP address as described above or by other methods such as those described below) can be employed to increase the effectiveness of combined online and television advertising over that of either advertising medium alone.

A particular targeted online advertisement thus directed typically is selected for delivery to the user's online user interface device (using the corresponding online access identifier) based on the user's observed behavior related to the television advertisement. Observed, interactive user behavior can be accomplished by TV viewers by clicking or selecting with a remote or other interface to the STB, or otherwise providing a selection to the TVP, during a so-called "interactive" advertisement. The clicking or selection can be done with respect to a particular link, command, or additional ad, by shopping or making purchases via the television, or by other user-controlled choices. Other observed viewer behavior can also be derived from analysis of user habits in selecting TV programs, which selections can be used in deciding what TV ad to deliver or avoid delivering to the user, and this type of interaction too can be used for the purposes described herein, namely custom delivery of online advertisements or decisions to record online behavior to measure the effectiveness of the TV ads. User behavior can also be derived from analysis or detection of user commands received by the television at a particular time, such as "skip," "fast-forward," "change channel," "change volume," or "mute" commands. Certain patterns of such commands can imply user skipping a television advertisements, and an advertiser can direct (or perhaps avoid directing) online ads to the user in response to such skipping, for example. Information about observed behavior related to television advertisements, optionally in association with collected demographic information, can be used by the CAS or by the profile provider to direct a targeted online ad.

In addition to directing online advertisements or tracking online behavior in response to user behavior related to a targeted television advertisement, the implementations described above, as well as those described below, can also be used to direct online advertisements or to track online activity in response to user behavior related to a non-targeted television advertisement. In such cases, the notification transmitted from the user's STB, or from a server that participated in or is aware of the delivery of the non-targeted television ad to STB 36, can be directed to any entity that participated in or benefitted from delivery of the television advertisement to enable that entity to cause online ads to be directed to the user or to track and record the user's subsequent online activity. Whether targeted or not, the television ads can be temporally interleaved with television programming or spatially combined (e.g., overlaid or juxtaposed) with television programming.

Another implementation of systems and methods according to the present disclosure is suitable for instances in which users are provided with both online access and television service by a common ISP/TVP (represented in the drawings by both of the boxes 22 and 24). As already described, it is typically the case that the users of online access service (i.e., the subscribers) are not provided with a static IP address; instead a dynamic IP address $IP_{modem}$ is temporarily allocated to the user's modem 32 for online access, often through DHCP. The dynamically assigned online access IP address is replaced after some time interval (or after some event occurs) by another IP address allocated to modem 32. The ISP/TVP 22/24 transmits (as in FIG. 8A) to a CAS 40, or perhaps to multiple CASs, the online access IP addresses of a multitude of users, perhaps along with corresponding pseudonyms, aliases, or other identifiers uniquely associated with the IP addresses, e.g., user XY123 is connected to the Internet through a modem 32 that is assigned IP address abc.def.ghi.jkl. Each online access IP address, and perhaps also its associated pseudonym, can be transmitted to CAS 40 immediately upon its allocation or reallocation by ISP/TV 22/24, which could be advantageous in sending targeted online ads to the user's modem quickly. Alternatively, online access IP addresses, and perhaps also the corresponding pseudonyms, can be transmitted periodically to CAS 40 at any necessary or desirable time interval or after any specified event, such as the collection of a predefined number of pairings. The pseudonyms and online access IP addresses typically comprise non-PII, although PII can be included as well if needed, desired, or permitted. The use of pseudonyms or other identifiers to associate online access and set-top box identifiers is disclosed in application Ser. No. 11/736,544, already incorporated herein by reference.

ISP/TVP 22/24 additionally transmits (as in FIG. 8A or 8B) to CAS 40 an STB identifier ($ID_{STB}$) allocated to STB 36 (statically or dynamically) and associates it with the pseudonym previously associated with the user's modem 32, e.g., user XY123 has an STB 36 with identifier PQRS456 in addition to a modem 32 for online access at IP address abc.def.ghi.jkl. The STB identifier can take any of the forms already described, including an identifier internal to ISP/TVP 22/24, an STB IP address allocated to STB 36 independent of modem 32, or a modem IP address that is shared by STB 36 (as in FIG. 2). The association of the user's online access IP address and the user's STB identifier at CAS 40 typically constitutes non-PII.

ISP/TVP 22/24 reports to CAS 40 (as in FIG. 8A or 8B) that, at a given time, user XY123 can access the Internet through modem 32 using online access IP address abc.def.ghi.jkl and can receive television service through STB 36 using STB identifier PQRS456. Those associations can be stored on CAS 40, or stored only by ISP/TVP 22/24 and transmitted to CAS 40 as needed. The STB 36 can monitor presentation of a television advertisement (targeted or not) on the user's television 38, or interaction of the user with an interactive television advertisement, and can transmit a notification of the same to CAS 40 (as in FIG. 6A or 6B, as appropriate) or to an online site 50 (as in FIG. 6C or 6D, as appropriate), along with the STB identifier PQRS456. Examples of interactions with a television advertisement that might be reported are given above. The television advertisement can be delivered to STB 36 over the TVP portion of the ISP/TVP infrastructure using a dedicated cable advertisement channel, an IP based protocol, or any other communication protocol, or the television advertisement can be delivered to STB 36 via the ISP portion of the ISP/TVP infrastructure.

Figure 7A:
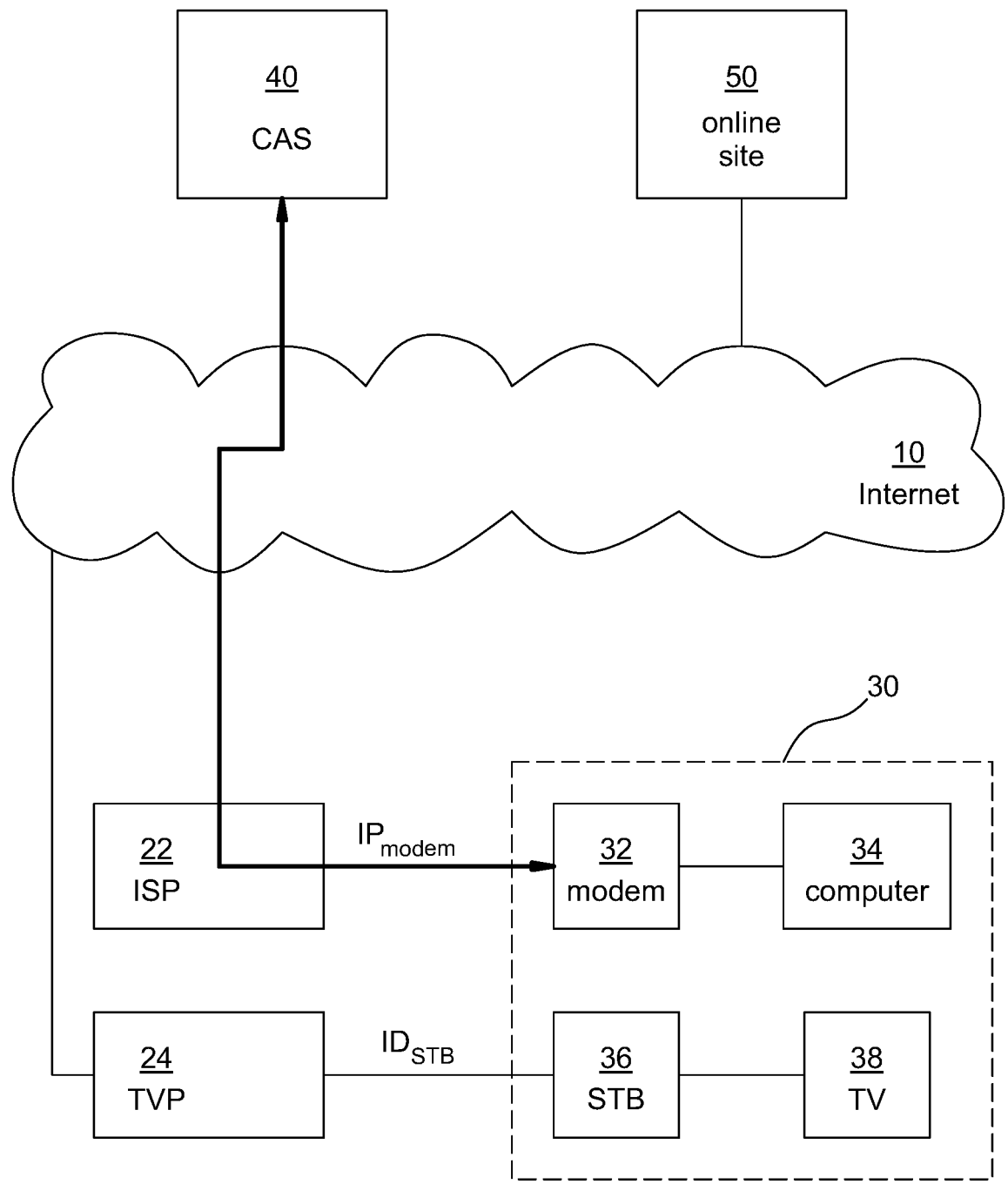
FIG. 7A depicts a CAS transmitting one or more targeted online advertisements to the user's computer via the modem or tracking and recording the user's online activity via the modem, in either case at the modem's current online access IP address, in response to a profile identifier transmitted to the CAS.
Figure 7B:
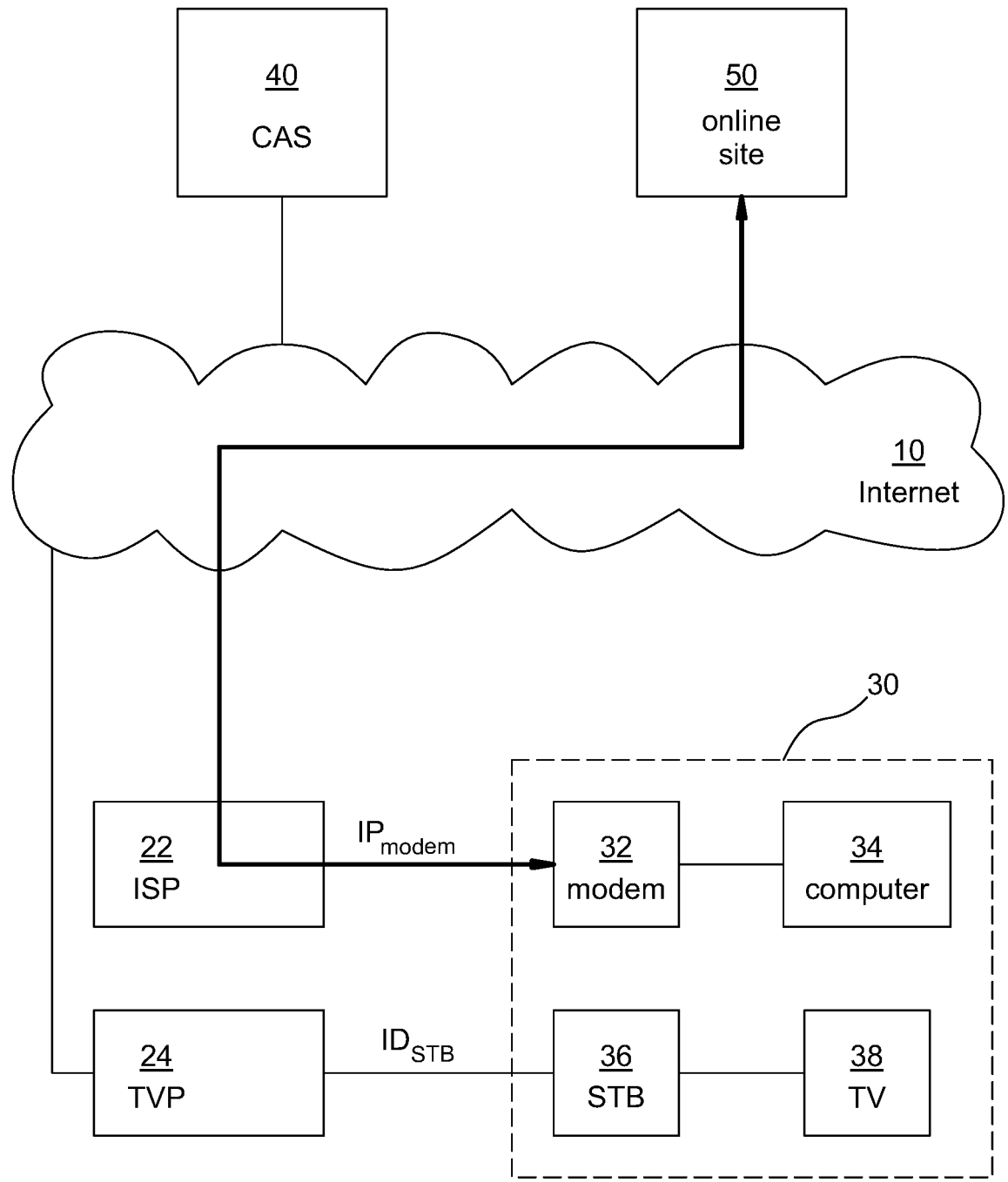
FIG. 7B depicts the same steps with an online site instead of the CAS.

In response to the notification transmitted to CAS 40, subsequent online activity of user XY123 using online access IP address abc.def.ghi.jkl or any subsequently assigned online access IP address associated with user XY123 can be tracked and recorded by CAS 40 (and subsequently linked to the delivered television advertisement). Alternatively, one or more targeted online advertisements can be directed by CAS 40 to user XY123 at online access IP address abc.def.ghi.jkl or any subsequently assigned online access IP address associated with user XY123 upon subsequent online activity by that user (in both cases, as shown in FIG. 7A). Alternatively, CAS 40 can cause one or more targeted online advertisements to be directed to the online access IP address currently associated with user XY123 from another online site or server (not shown). In response to the notification transmitted to online site 50, subsequent online activity of user XY123 using online access IP address abc.def.ghi.jkl or any subsequently assigned online access IP address associated with user XY123 can be tracked by online site 50 (and subsequently linked to the delivered television advertisement). Alternatively, one or more targeted online advertisements can be directed by online site 50 to user XY123 at online access IP address abc.def.ghi.jkl or any subsequently assigned online access IP address associated with user XY123 upon subsequent online activity by that user (in both cases, as shown in FIG. 7B). Alternatively, online site 50 can cause one or more targeted online advertisements to be directed to the current online access address from another online site or server (not shown). Targeted online ads can be selected based on any suitable profile information or criteria, as described elsewhere herein.

Figure 8A:
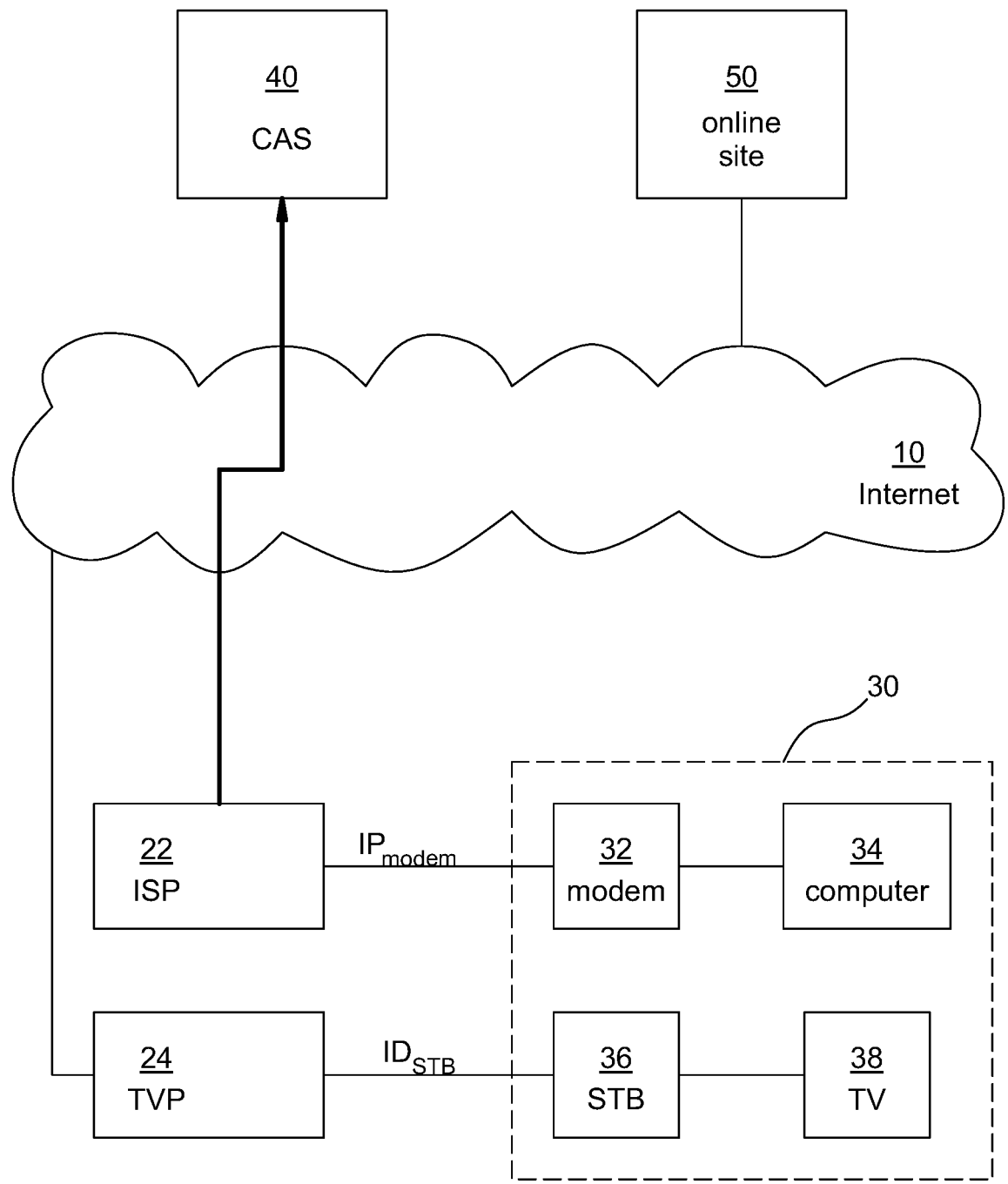
FIG. 8A depicts an ISP/TVP transmitting to a CAS information, including online access IP addresses of a multitude of users, STB identifiers, or associations between modems and STB identifiers.
Figure 8B:
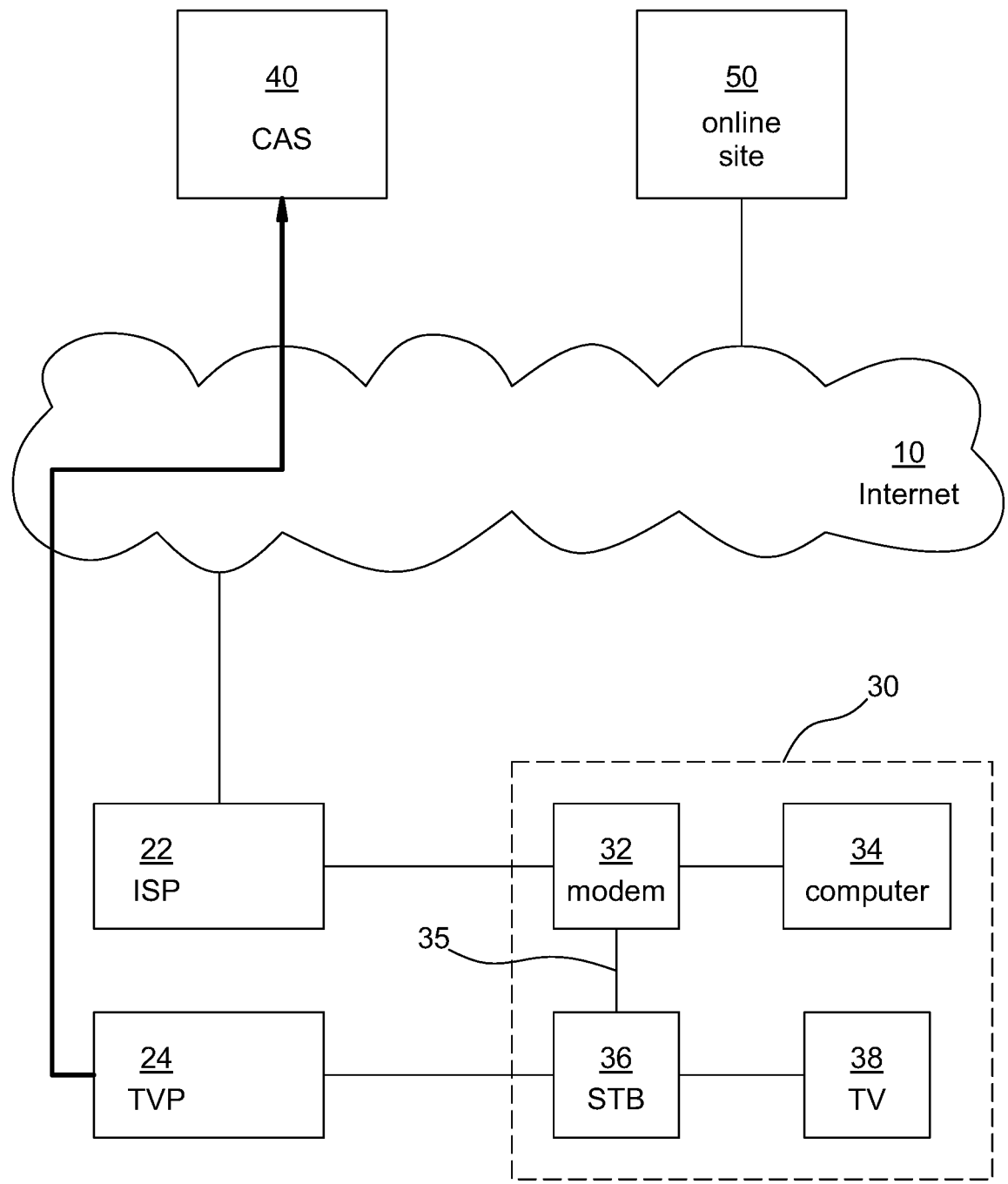
FIG. 8B depicts an ISP/TVP transmitting to a CAS additional information, including an STB identifier associated with a pseudonym previously associated with a user's modem for online access at an IP address, or associations between modems and STB identifiers.

As IP addresses or STB identifiers are dynamically assigned and reassigned, ISP/TVP 22/24 reports updated online access IP addresses or STB identifiers to CAS 40 (as in FIG. 8A or 8B). The updated IP addresses, identifiers, and their associated pseudonyms can be transmitted to CAS 40 immediately upon allocation or reallocation by ISP/TV 22/24, or can be transmitted periodically to CAS 40 at any necessary or desirable time interval (fixed or variable). Although assignment of a pseudonym associated with both the online access IP address and the STB identifier can facilitate delivery of online ads to modem 32 based on the user's observed behavior related to a television advertisement delivered via STB 36, it is not necessary. All that is required is an association between the STB identifier related to an earlier delivered television ad and the online access IP address of subsequent online activity to enable subsequent delivery of online ads based on the user's earlier television activities (with, or perhaps preferably without, relying on PII).

A TVP/ISP can make associations between online access identifiers and set-top box identifiers without any involvement of CAS 40 or other outside server or profile provider. The TVP/ISP can make such associations in real time, or the associations can be established later using database or log files to correlate television ads delivered to STB's and online ads or activity from users' computers. Associations thus established can be used to cause online ads to be directed to users' computers from CAS 40 or other ad server. The TVP/ISP itself can track and record online behavior and can share the resulting data with a profile provider or television advertiser as permitted or desired.

CAS 40 need not necessarily rely on updates of the IP address associated with the user pseudonym. Upon encountering the user's computer 34 from an IP address associated with, e.g., user XY123, CAS 40 can set a cookie or tag on computer 34. That cookie can associate, upon future encounters with CAS 40, the user of computer 34 with a user profile associated with user XY123 or with STB identifier PQRS456 associated with user XY123, independent of any update by ISP/TVP 22/24 of the IP address associated with user XY123. Subsequent contact between CAS 40 and the user's computer 34, with online tracking or delivery of targeted online ads, could then be implemented as described above when using a profile identifier. The cookie placed by CAS 40 can therefore act as an online access identifier.

In yet another implementation of systems and methods according to the present disclosure, the user need not receive both television service and Internet access from a common service provider. In an exemplary embodiment arranged as in FIG. 2, a user's STB 36 can periodically contact a CAS 40 (or multiple CASs) via the IP address of the user's modem 32 that is therefore common to STB 36. The common IP address ($IP_{modem}$) is dynamically assigned by ISP 22 to the user's modem 32 or other online access equipment. Modem 32 can include a router to route network traffic properly among the user's computer (or computers or other devices) 34 and the user's STB 36. Alternatively, a separate router can be employed, or computer 34 or STB 36 or television 38 can include routing functions, for properly routing network traffic passing through modem 32, with STB 36 providing routing functions or being connected to the separate router, to computer 34, or to television 38 as appropriate. STB 36 reports the common IP address to CAS 40 with which it is in contact. However, STB 36 itself might not know the common IP address it is using, because it communicates through modem 32. In such circumstances, STB 36 nevertheless can report the common IP address to CAS 40 (e.g., at some appropriate time interval) simply by initiating communication through modem 32 to CAS 40, thereby enabling CAS 40 to extract the common IP address from the communication. The use of a common IP address associate online access and set-top box IP addresses is disclosed in application Ser. No. 11/736,544, already incorporated herein by reference.

In such implementations, that common IP address can, at least initially, comprise the electronic association that enables targeted online advertising or tracking/recording based on observed user behavior related to a television advertisement (described further below). For example, STB 36 can be connected to a local area network (LAN) that shares modem 32 for online access. In such an arrangement, network traffic is routed to a common IP address (i.e., the IP address of modem 32) for STB 36 and other devices connected to the LAN. The user can receive online access from any online service provider via any suitable modem 32 (from cable, DSL, wireless, satellite, or any other transmission system) or other suitable online access device and can receive television service from any suitable television service provider through STB 36. In this implementation the term "common IP address" denotes the IP address of a modem 32 or other online access device to which remote network traffic is routed for all of the multiple devices sharing a common connection to the remote network (Internet 10) through that modem. For example, the IP address of a modem connecting to the Internet a router in a local area network (LAN) would constitute the common IP address for multiple devices connected to the LAN for online access, even though those multiple devices typically also have individual IP addresses assigned by the router for routing traffic within the LAN. An online site or server accessed by any one of the multiple devices only "sees" the common IP address ($IP_{modem}$). As noted above, in future network implementations (e.g., IPv6) each device can have its own unique network address.

The common IP address enables delivery of targeted online ads to modem 32 based on television access through STB 36 having the common IP address (or based on other user profile information derived from television activity observed as originating from the STB IP address of STB 36, i.e., from the common IP address). The existence of the common IP address associates the online access IP address and the set-top box IP address. This need not necessarily include PII. A time interval for periodic reporting by the STB 36 to the CAS 40 can be set to any appropriate time period, e.g., every five minutes, every hour, or at some other necessary or desirable time interval for reporting the common IP address to CAS 40. The time interval can be selected to be commensurate with a typical or average time interval for dynamic reassignment of the online access IP address by the user's Internet Service Provider. The selected time interval can be made adjustable if needed or desired. Alternatively or additionally, the contact between the STB 36 and the CAS 40 may not be set to occur at a fixed time interval but rather irregularly, such as instances where it is triggered by dynamic reassignment of the online access IP address by the ISP 22.

When a user views, interacts with, or otherwise responds to a television advertisement (targeted or not), user profile information derived from the user's activity related to that television advertisement can be delivered electronically from STB 36 (or from a server that participated in or aware of delivery of the television ad to STB 36) to CAS 40. Delivery from STB 36 can be via modem 32 (as in FIG. 6A) or via TVP 24 (as in FIG. 6B), and can include intermediate servers. In response to the notification transmitted to CAS 40, subsequent online activity of the user using modem 32 (using the common IP address applicable at the time of the subsequent online activity; FIG. 7A) can be tracked by CAS 40, or one or more targeted online advertisements can be directed by CAS 40 to the user later (using the common IP address applicable when directing the online ad; FIG. 7A). Alternatively, CAS 40 can cause one or more targeted online advertisements to be directed to the applicable online access address from another online site or server (not shown). In response to the notification transmitted to online site 50, subsequent online activity of the user using the applicable online access IP address can be tracked by online site 50 or one or more targeted online advertisements can be subsequently directed by online site 50 to the user at the applicable online access IP address (in both cases, as shown in FIG. 7B). Alternatively, online site 50 can cause one or more targeted online advertisements to be subsequently directed to the online access address from another online site or server (not shown). Targeted online ads can be selected based on any suitable criteria, as described elsewhere herein.

Various methods for determining the applicable common IP address for directing the targeted online ad or tracking online behavior are described below. Once an applicable common IP address is identified for a given television ad delivered to STB 36, CAS 40 need not necessarily rely further on such a common IP address for subsequent online ads or online tracking related to that television ad. CAS 40 can set a cookie or tag on computer 34 that associates the user of computer 34 with the user profile that is associated with the television ad originally delivered to STB 36. Upon future encounters, independent of any change of the common IP address, the association of the user of computer 34 with the television ad delivered to STB 36 is recognized by CAS 40 by reading the cookie. Subsequent contact between CAS 40 and the user's computer 34, with online tracking or delivery of targeted online ads, could then be implemented as described above when using a profile identifier. The cookie placed by CAS 40 can therefore act as an online access identifier.

The targeted online ad can be directed to a modem at a common IP address previously reported by STB 36 to CAS 40 as the common IP address associated with modem 32 and STB 36 and from which the notification was received. Alternatively the targeted online ad can be directed to a modem at a common IP address reported by STB 36 as the common IP address applicable at a later time. It may often happen that a user accesses the Internet through modem 32 only a substantial time interval after transmission of the notification to CAS 40 or online site 50. In that case, the common IP address reported to CAS 40 or online site 50 as part of the notification might no longer be assigned to modem 32 (and hence to STB 36), and the targeted online ad or the online tracking might be misdirected. This difficulty can be addressed in one of several ways.

In one example, upon encountering the user's computer 34 from an online IP address corresponding to the IP address reported by STB 36 when the television ad was delivered, CAS 40 can read a cookie it previously set on that computer (if any) and determine if the online access IP address reported by computer 34 at that previous encounter is the same as that reported at the current encounter. If so, then it is highly likely that the current online access IP address is the applicable common IP address shared by STB 36 at the time of the television ad delivery, and the targeted online ad or online tracking will be correctly directed. If the earlier and current reported online access IP addresses do not match, then (i) CAS 40 can forgo the opportunity for targeted online ads or online tracking, or (ii) CAS 40 can direct an online ad or track online behavior at the current IP address reported by computer 34 despite the possibility of erroneous online ad delivery or erroneous online tracking. The decision to forgo the opportunity can be automatic or can be based on any suitable criterion, e.g., the time intervals between STB 36 reporting the television ad delivery and computer 34 reporting its online access IP addresses.

In another example, a database is maintained recording, for each television advertisement delivered to STB 36, the applicable common IP addresses then assigned to modem 32, along with corresponding dates and times and observed ad related user behavior (e.g., mere user viewing of the TV ad, user interaction with the TV ad, or information related to targeting of the TV ad), if any. Such an STB/ad database also includes the most recent common IP address, whether any TV ad was delivered to the STB while assigned that IP address or not. The STB/ad database is often referenced as a "log" or "history," or by using alternative terms. For purposes here, the term "database" shall be deemed to encompass such logs associating the specified data, regardless of the format in which the information is kept or how it is connected or associated. The STB/ad database can be stored and updated by STB 36 or computer 34, and can preferably be transmitted to and stored by CAS 40. The STB/ad database can be updated at regular temporal intervals, or updating can be triggered by specific events, e.g., receiving a television ad or reassignment of the common IP address, and the updating includes transmission of the updated database to CAS 40. The STB/ad database typically would be updated using data provided by the STB itself, because the STB can most readily associate its current common IP address with its own past common IP addresses (as disclosed in application Ser. No. 11/736,544, already incorporated herein by reference).

Upon subsequent online activity by the user using modem 32, the current common IP address is transmitted by modem 32 to CAS 40 or online site 50. If an STB ad database record is found having that common IP address as its most recently assigned common IP address, then it is possible that the STB associated with that database record is the STB 36 associated with the modem 32. The likelihood of that association being valid depends on the relative lengths of the time intervals between successive reassignments of the common IP address and successive updates of the database on CAS 40. The associated STB/ad database can be searched for records of previous observed user behavior related to previously delivered television ads. If any such records are found, then CAS 40 or online site 50 can track the subsequent online activity from modem 32 or deliver targeted online ads to modem 32 (as in FIG. 7A or 7B) responsive to the observed behavior, as already described above. The current common IP address and the common IP address at the time of previous delivery of a television ad (i.e., a previous STB identifier) may not be the same, but they are nevertheless associated by the STB/ad database.

If the STB/ad database is updated periodically, the periodic interval is preferably sufficiently small relative to the typical or average time interval between reallocation of IP addresses to keep the probability that a database matching the current common IP address does not correspond to the STB 36 connected the modem 32 (resulting in a targeted online ad being directed to the common IP address based on behavior observed for a different STB) within acceptable limits. Such a time intervals can be minutes, hours, days, or some other suitable or desired time interval. A small fraction of targeted online ads will be directed based on observed behavior from the wrong STB, if the STB/ad database has not been updated since the most recent common IP address reassignment, but that fraction can be reduced by reducing the update time interval, at a cost of repetitive processing and transmission. The STB/ad database can be updated or purged on any desired schedule, so that it can cover an immediately preceding time period of hours, days, weeks, or some other suitable or desired time period.

In another exemplary embodiment, the user's modem 32, computer 34, or STB 36 can be assigned an extra identifier for validating an association established by searching the STB/ad database and avoiding erroneous online ads or tracking. Such an extra identifier need not include PII and can be permanently or temporarily assigned. Such extra identifiers are described in application Ser. No. 11/736,544 cited above, and any extra identifier can be included in the records of the STB/ad database and in the transmission of the current common IP address by modem 32 to CAS 40 or online site 50. Examples of extra identifiers could include an equipment serial number or a portion thereof, a device MAC address or a portion thereof, a username, a pseudonym, a confirmation number (random or not), a tag, or any other identifying code or data element. CAS 40 can place an extra identifier on STB 36 or computer 34 the first time contact is made and read or amend the extra identifier every time afterwards that contact is made. Such an extra identifier would be considered a "cookie" when stored on computer 34 and used by online servers to recognize the visitor's computer; such an extra identifier on modem 32 or STB 36 would serve an analogous function. The extra identifier can include the common IP address that modem 32 and STB 36 use when in contact with CAS 40, so that, when in contact, CAS 40 can compare the current common IP address with previous common IP addresses without necessarily searching through a database. From a privacy perspective, there is an advantage to using extra identifiers placed by CAS 40 on STB 36, modem 32, or computer 34, because that can enable the user to control the extra identifiers and set privacy settings to match user preference. A user may, for example, erase an extra identifier, alter an extra identifier to inform the CAS the next time it is in communication that the user is not interested in targeted ads, interested only in ads targeting behavior from the last seven days, interested in ads in certain categories only, or interested in all types of ads except for certain excluded categories (e.g., adult content). In addition to reporting the common IP address to CAS 40, STB 36, modem 32, or computer 34 can also report the extra identifier. Matching such an extra identifier can significantly reduce the likelihood that a targeted online ad will be misdirected.

An STB/ad database or an extra identifier can also be employed in the other implementations disclosed herein.

Regardless of the specific implementation or embodiment employed, the systems and methods disclosed herein can be employed to provide those users viewing or interacting with the television advertisements additional opportunities for receiving related information. In one exemplary embodiment, a television advertiser or other profile provider can request, via the delivered television advertisement and STB 36, permission to contact the user by telephone, electronic mail, or postal mail, and can additionally request the user's preferred means of communication. Such contact would typically require PII. The request for permission can be accompanied by a request for the user to provide or confirm any PII required for making contact with the user, or the advertiser may use PII already available to the advertiser, the TVP, or the profile provider. Alternatively, the request for permission can include further permission for the television advertiser or profile provider to receive or retrieve the necessary PII from STB 36 or CAS 40 (if available therefrom). Any of the requests described can be made directly by the television advertiser or profile provider, indirectly via CAS 40, or by CAS 40 on behalf of the television advertiser or profile provider. If the viewer grants permission, that permission can become part of the profile information, along with any additional profile information collected in the course of the subsequent contact.

In any of the implementations requiring determination, use, storage, or transmission of IP addresses, those can be achieved in a variety of ways. Examples are disclosed in application Ser. No. 11/736,544, already incorporated herein by reference. In some of such implementations, more than one online user interface device can share an IP address.

Additional targeting criteria can be employed to direct targeted online ads to or track online behavior from the correct online user interface device, based on information concerning user behavior related to a TV ad delivered to the associated set-top box. Examples of such targeting criteria are disclosed in application Ser. No. 11/736,544, already incorporated herein by reference. Even if the correct online user interface device (or group of devices sharing a network address) is determined, in some instances that device can be used by multiple users. In such instances, online advertisements can also be targeted, or online activity tracked, based on information concerning user behavior related to a TV ad delivered to the associated set-top box, but further taking into consideration the particular online activity on the user interface device at a given time (e.g., type of online content viewed or online searches performed). Examples of such online activity and how to take it into account are disclosed in application Ser. No. 11/736,544, already incorporated herein by reference.

In any of the implementations including delivery of online ads, the user's computer 34 or other online user interface device can be configured to filter the targeted online advertisements. Examples are disclosed in application Ser. No. 11/736,544, already incorporated herein by reference.

Figure 9:
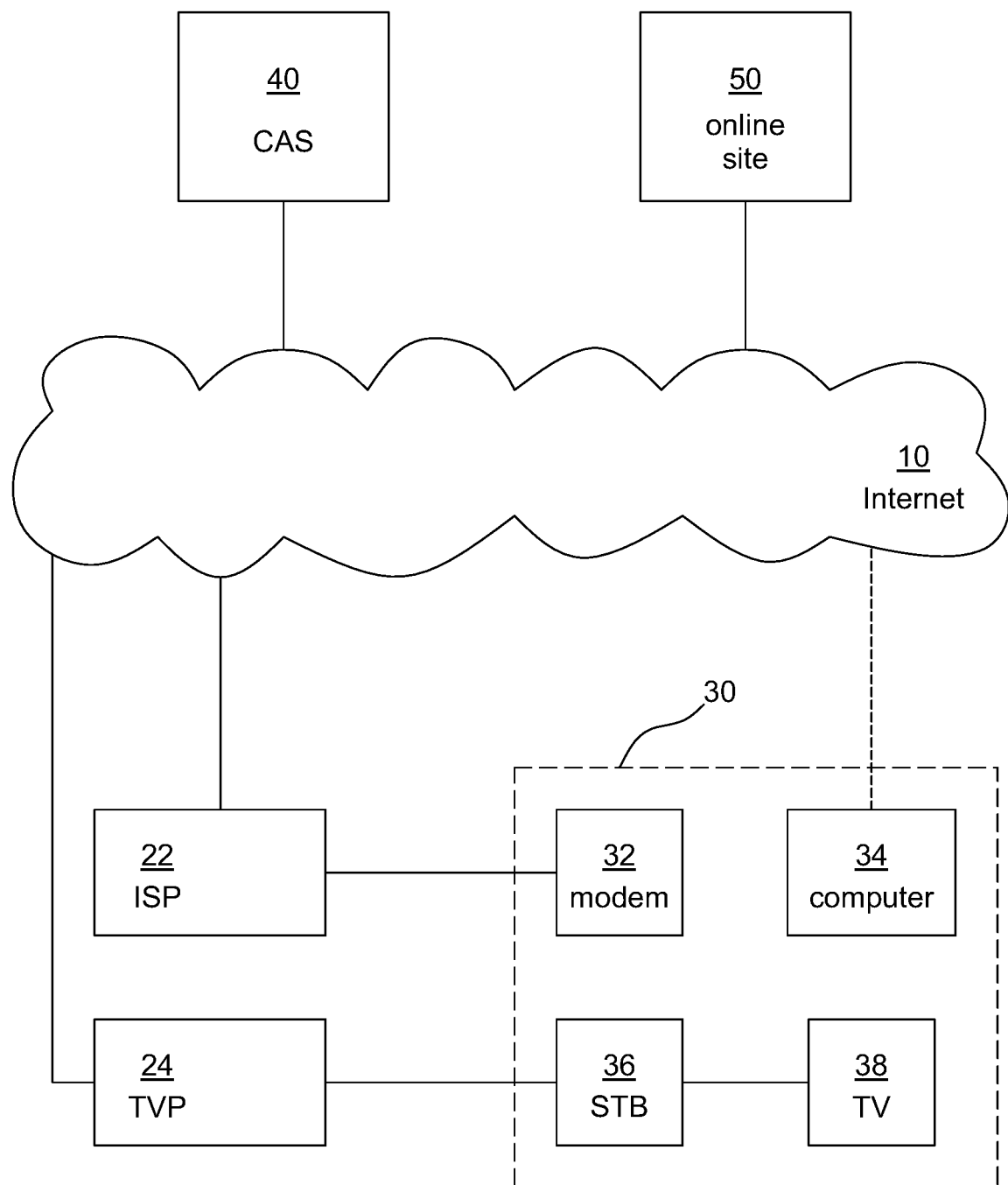

However the user's online access and STB IP addresses are associated, the association can in some instances be maintained even if the online user interface device 34 is a mobile device (e.g., an Internet-enabled cell phone, handset, PDA, or laptop computer) that is intermittently disconnected from modem 32 and is connected to the Internet through another connection (e.g., another LAN, a wireless hotspot, or a cell phone network, as in FIG. 9). Examples are disclosed in application Ser. No. 11/736,544, already incorporated herein by reference.

In any of the implementations including delivery of targeted online ads, the online ads can be provided by a wide variety of sources or entities. Examples are disclosed in application Ser. No. 11/736,544, already incorporated herein by reference, of various sources for targeted television advertisements. Targeted online ads can be provided by a similar array of sources or entities.

In any of the disclosed implementations, revenue can be generated and distributed among the involved entities in a wide variety of ways. Some examples are disclosed in application Ser. No. 11/736,544, already incorporated herein by reference. In various examples, a profile provider can be compensated for enabling targeting of a television advertisements as well as subsequent online ads targeted based on the television ad.

The systems and methods disclosed herein can be implemented as general or special purpose computers or other programmable hardware devices programmed through software or as hardware or equipment "programmed" through hard wiring, or a combination of the two. Computer programs or other software, if used, can be implemented in temporary or permanent storage or in replaceable media, such as by including programming in microcode, object-oriented code, web-based or distributed software modules that operate together, RAM, ROM, CD-ROM, DVD-ROM, hard drives, thumb drives, flash memory, optical media, magnetic media, semiconductor media, or any future storage alternatives.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims. For example, where the term "product" is used in connection with a shopping or purchase request, the product can be a physical product, intangible product, or a service.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of . . . ," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," and "having," and variants thereof, shall be construed as open ended terminology, with the same meaning as if the phrase "at least" were appended after each instance thereof.

What is claimed is:

1. A method performed by equipment of a profile provider entity that owns or controls a central advertising server (CAS), the equipment having communicative access:
   (i) to computer programs respectively located on a multitude of set-top boxes (STBs) that have respective STB identifiers and that receive respective signals from the Internet and are connected to respective television displays to present content from the received signals via the television displays, and
   (ii) to a data store containing a multitude of associations between (A) respective ones of the STB identifiers of the multitude of STBs and (B) online access identifiers of respective of a multitude of computerized online user interface devices, each of the multitude of associations being based on automatically recognizing that the respective computerized online user interface device and the respective STB was connected, independently of each other, to a common local area network,
   the method comprising:
   (a) automatically recording, in a first user profile, indicia of presentation of a first television advertisement via the first STB, as a result of receipt by the CAS of a notification from the computer program of a first STB that is one of the multitude of STBs, which computer program observes presentation of the first television advertisement, which notification contains (i) indicia of the STB identifier of the first STB, and (ii) indicia of the first television advertisement having been presented via the first STB; and
   (b) later, automatically causing a first online advertisement to be displayed in a first online ad space viewable by a first online user interface device of the multitude of computerized online user interface devices, which first online advertisement is selected based on profile information from the first user profile, as a result of receipt by the CAS of a first online access identifier, which first online access identifier (i) corresponds, at the time of the first online advertisement is caused to be displayed in the first online ad space, to the first online user interface device, and (ii) is associated in the data store with the STB identifier of the first STB.

2. The method of claim 1 wherein the STB identifier of the first STB and the first online access identifier are associated without using personally identifiable information pertaining to either a user of the first online user interface device or a user of the first STB.

3. The method of claim 1 wherein the first user profile meets a targeting criterion for the first online advertisement.

4. The method of claim 1 wherein the first television advertisement presented via the first STB was received by the first STB via IP based protocol.

5. The method of claim 1 wherein the first television advertisement presented via the first STB presented via the first STB was transmitted via satellite.

6. The method of claim 1 wherein the first television advertisement presented via the first STB was a targeted advertisement.

7. The method of claim 1 wherein the first television advertisement presented via the first STB was a non-targeted advertisement.

8. The method of claim 1 further comprising automatically recording in the first user profile, indicia of user interaction behavior with respect to the first television advertisement presented via the first STB.

9. The method of claim 1 wherein the first STB contains a television tuner.

10. The method of claim 1 wherein the first STB is also coupled to cable television transmission infrastructure.

11. The method of claim 1 wherein the first television advertisement presented via the first STB was transmitted via cable.

12. The method of claim 1 wherein the first STB is physically integrated with the respective television display.

13. The method of claim 1 wherein the computer program observes presentation of the first television advertisement with permission of a user of the first STB.

14. The method of claim 2 wherein:
   (a) the computer program observes presentation of the first television advertisement with permission of a user of the first STB; and
   (b) the first television advertisement presented via the first STB was a non-targeted advertisement and was transmitted via cable.

15. The method of claim 12 wherein:
   (a) the first user profile meets a targeting criterion for the first online advertisement; and
   (b) the first television advertisement presented via the first STB was transmitted via satellite.

16. A computer system having communicative access:
   (i) to computer programs respectively located on a multitude of set-top boxes (STBs) that have respective STB identifiers and that receive respective signals from the Internet and are connected to respective television displays to present content from the received signals via the television displays, and
   (ii) to a data store containing a multitude of associations between (A) respective ones of the STB identifiers of the multitude of STBs and (B) online access identifiers of respective of a multitude of computerized online user interface devices, each of the multitude of associations being based on automatically recognizing that the respective computerized online user interface device and the respective STB was connected, independently of each other, to a common local area network,
   the computer system being structured and programmed to perform a method comprising:

(a) automatically recording, in a first user profile, indicia of presentation of a first television advertisement via the first STB, as a result of receipt by the computer system of a notification from the computer program of a first STB that is one of the multitude of STBs, which computer program observes presentation of the first television advertisement, which notification contains (i) indicia of the STB identifier of the first STB, and (ii) indicia of the first television advertisement having been presented via the first STB; and (b) later, automatically causing a first online advertisement to be displayed in a first online ad space viewable by a first online user interface device of the multitude of computerized online user interface devices, which first online advertisement is selected based on profile information from the first user profile, as a result of receipt by the computer system of a first online access identifier, which first online access identifier (i) corresponds, at the time of the first online advertisement is caused to be displayed in the first online ad space, to the first online user interface device, and (ii) is associated in the data store with the STB identifier of the first STB.

17. The computer system of claim 16 wherein the STB identifier of the first STB and the first online access identifier are associated without using personally identifiable information pertaining to either a user of the first online user interface device or a user of the first STB.

18. The computer system of claim 16 wherein the first user profile meets a targeting criterion for the first online advertisement.

19. The computer system of claim 16 wherein the first television advertisement presented via the first STB was received by the first STB via IP based protocol.

20. The computer system of claim 16 wherein the first television advertisement presented via the first STB presented via the first STB was transmitted via satellite.

21. The computer system of claim 16 wherein the first television advertisement presented via the first STB was a targeted advertisement.

22. The computer system of claim 16 wherein the first television advertisement presented via the first STB was a non-targeted advertisement.

23. The computer system of claim 16 further comprising automatically recording in the first user profile, indicia of user interaction behavior with respect to the first television advertisement presented via the first STB.

24. The computer system of claim 16 wherein the first STB contains a television tuner.

25. The computer system of claim 16 wherein the first STB is also coupled to cable television transmission infrastructure.

26. The computer system of claim 16 wherein the first television advertisement presented via the first STB was transmitted via cable.

27. The computer system of claim 16 wherein the first STB is physically integrated with the respective television display.

28. The computer system of claim 16 wherein the computer program observes presentation of the first television advertisement with permission of a user of the first STB.

29. The computer system of claim 17 wherein:
(a) the computer program observes presentation of the first television advertisement with permission of a user of the first STB; and
(b) the first television advertisement presented via the first STB was a non-targeted advertisement and was transmitted via cable.

30. The computer system of claim 27 wherein:
(a) the first user profile meets a targeting criterion for the first online advertisement; and
(b) the first television advertisement presented via the first STB was transmitted via satellite.

* * * * *